(12) United States Patent
Takeuchi et al.

(10) Patent No.: US 6,434,028 B1
(45) Date of Patent: Aug. 13, 2002

(54) DC TO DC CONVERTER

(75) Inventors: Yukihisa Takeuchi, Nishikamo; Iwao Ohwada, Nagoya, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/962,486

(22) Filed: Sep. 25, 2001

(30) Foreign Application Priority Data

Oct. 4, 2000 (JP) ........................................ 2000-305217

(51) Int. Cl.$^7$ ................................................ H02N 7/00

(52) U.S. Cl. ........................ 363/59; 327/534; 327/536

(58) Field of Search .................... 363/59, 600, 147; 327/534, 536, 564, 157

(56) References Cited

U.S. PATENT DOCUMENTS 5,519,654 A * 5/1996 Kato et al. ................... 327/532
6,002,355 A * 12/1999 Del Signore et al. ....... 327/534

OTHER PUBLICATIONS

Rajeevan Amirtharajah, et al., "A Micropower Programmable DSP Powered Using a MEMS-based Vibration-to-Electric Energy Converter," 2000 IEEE International Solid-State Circuits Conference, pp. 362–363, Feb. 2000.

Scott Meninger, et al., "Vibration-to-Electric Energy Conversion," ISLPED, pp. 48–53, Aug. 1999.

* cited by examiner

Primary Examiner—Shawn Riley
(74) Attorney, Agent, or Firm—Burr & Brown

(57) ABSTRACT

A DC to DC converter is provided with a first element for raising a voltage from a voltage-generating source based on capacitance-varying operation effected by an actuator section. The first element comprises a capacitance-forming component and the actuator section. The actuator section includes an operating section, a vibrating section for supporting the operating section, and a fixed section for vibratingly supporting the vibrating section. The operating section includes a shape-retaining layer, an upper electrode, and a lower electrode. The capacitance-forming component includes the upper electrode of the actuator section, a dielectric member formed on the upper electrode, and an electrode section connected to a current supply line.

14 Claims, 27 Drawing Sheets

FIG. 6

| INTERVAL | t11 | t12 | t13 | t14 | t15 | t16 |
|---|---|---|---|---|---|---|
| SW1 | ON | → OFF | OFF | OFF | OFF | OFF |
| SW2 | OFF | OFF | OFF | ON | → OFF | OFF |
| SW3 | A | A | A | A | A | A |
| SW4 | C | C | D → | D | D | C ↑ |
| C1 | Cmax | Cmax | C1b → | C1b | C1b | Cmax ↑ |
| APPLIED VOLTAGE TO ACTUATOR | Vb | Vb | Va2 → | Va2 | Va2 | Vb ↑ |

← $V1b=Vin$    ← $V1b=Vc2$    ← $V2b=V1b$ (SW2:ON)

(REPEAT)

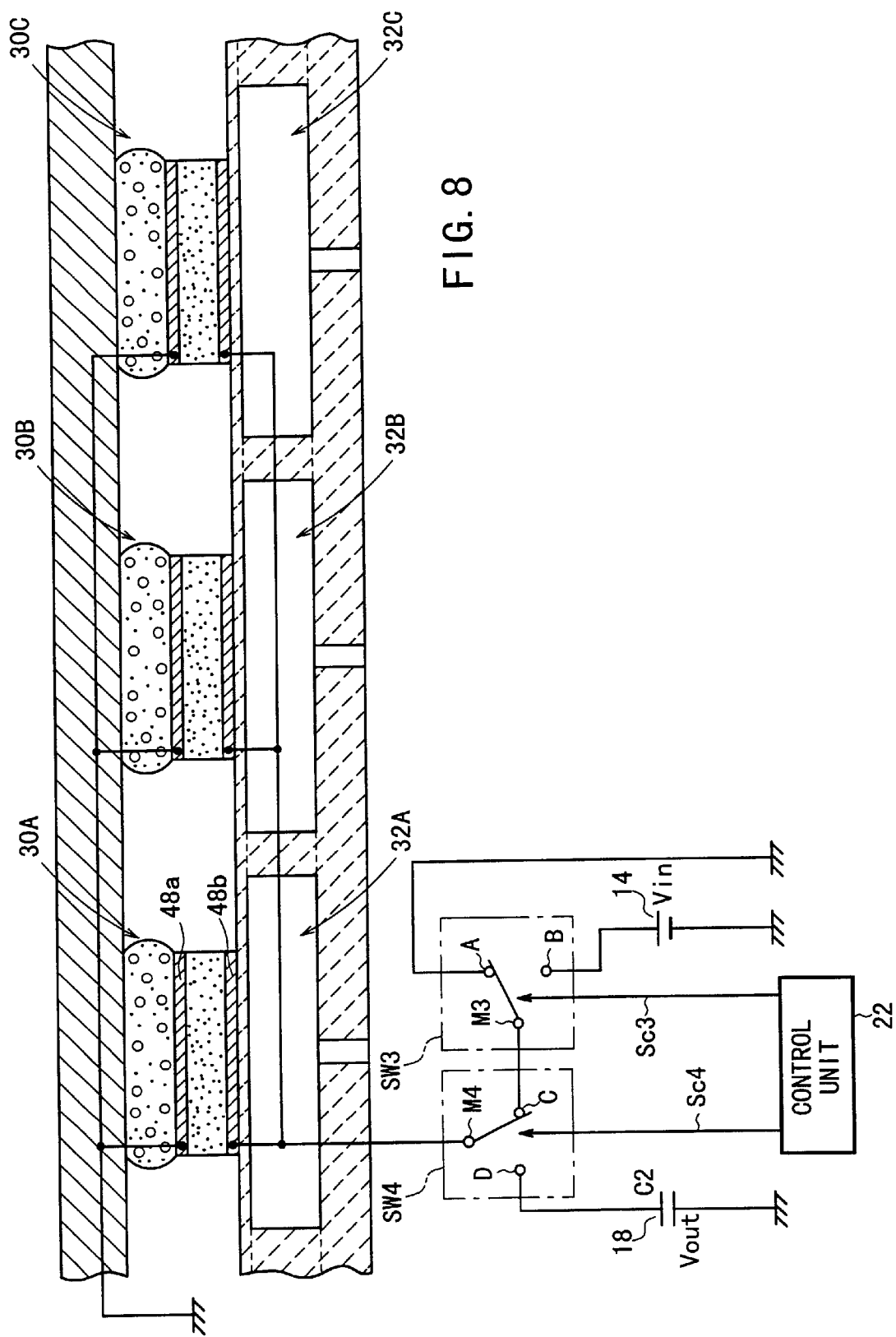

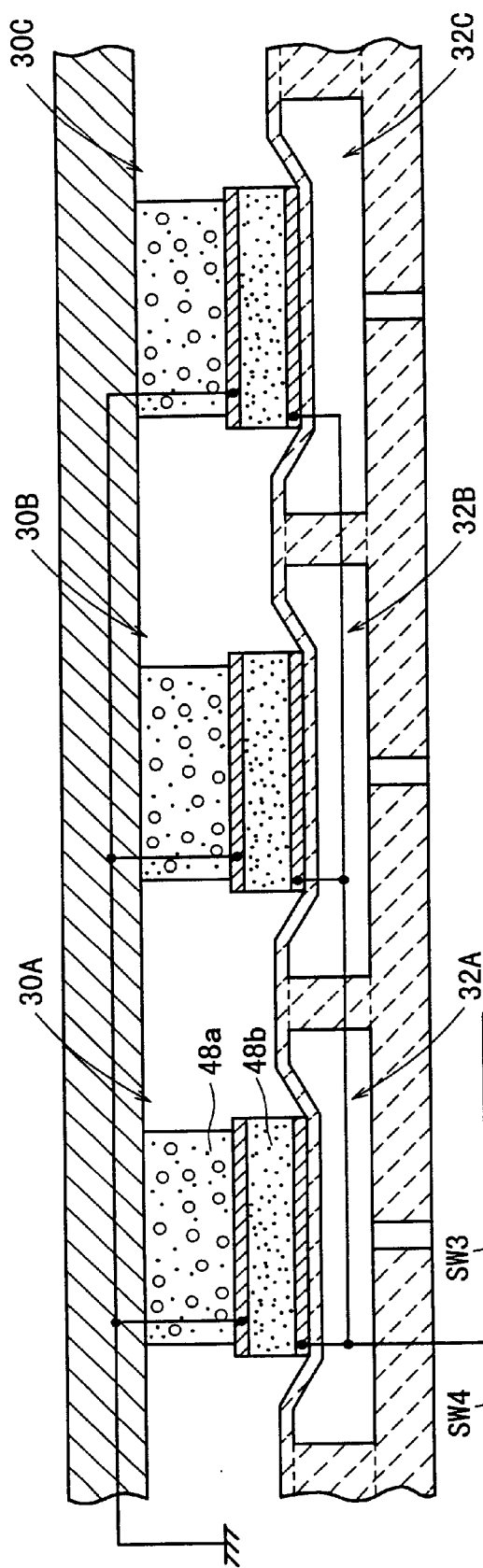
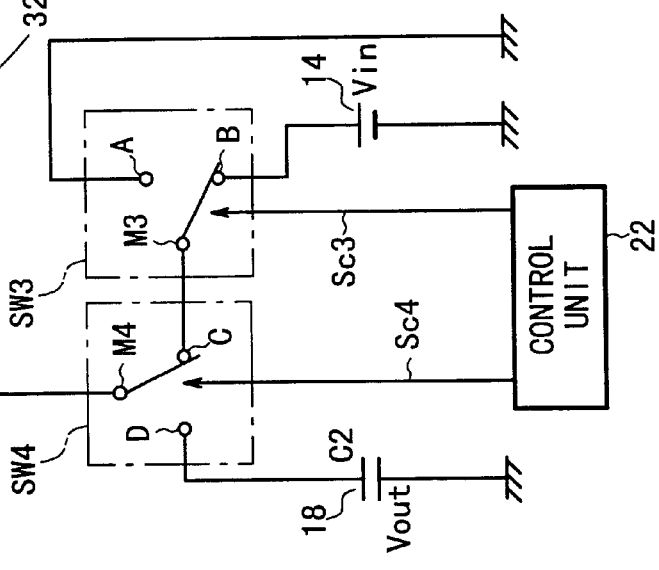
FIG. 9

FIG. 24

| INTERVAL | t31 | t32 | t33 | t34 | t35 | t36 | t37 |
|---|---|---|---|---|---|---|---|
| SW1 | OFF | ON → | → OFF | OFF | OFF | OFF | OFF |
| SW2 | OFF | OFF | OFF | OFF | ON | → OFF | OFF |
| SW3 | A | A | A | A | A | A | A |
| SW4 | C | C | C → | D | D | D | C |
| SW7 | ON | → OFF | OFF | OFF | OFF | OFF | OFF |
| C1 | Cmax | Cmax | Cmax | → C1b | C1b | C1b | → Cmax |
| APPLIED VOLTAGE TO ACTUATOR | Vb | Vb | Vb | → Va2 | Va2 | Va2 | → Vb |

$i_L$ MAXIMUM   V1b=Vc2   V2b=V1b+Vin   (REPEAT)

DC TO DC CONVERTER

BACKGROUND OF THE INVENTION

1. Field of the Invention

The present invention relates to a DC to DC converter for raising a voltage supplied from a voltage-generating source and retaining a raised voltage in an arbitrary polarity.

2. Description of the Related Art:

In general, DC to DC converters are classified into a chopper type switching converter, a flyback converter, a forward converter, a charge pump type converter, etc. These types are used in different ways depending on the purpose of use.

The respective types of DC to DC converters may be compared with each other as follows. The chopper type switching converter requires a coil. The flyback converter and the forward converter require a transformer. Therefore, these types are disadvantageous when miniaturization is required, and are expensive. Further, the circuit configuration is complicated as well, and the adjusting operation is also troublesome.

On the other hand, the charge pump type converter requires no large parts such as a coil or a transformer. Therefore, this type converter is advantageously miniaturized, and the circuit can be constituted inexpensively.

A mechanical vibration-electric energy converter, in which a DC to DC converter 200 of the charge pump type is applied, will now be explained with reference to FIGS. 25 to 27.

This converter is reported in a literature "A Micropower Programmable DSP Powered using a MEMS-based Vibration-to-Electric Energy Converter" (Rajeevan Amirtharajah et al., M.I.T., 2000 IEEE International Solid-State Circuits Conference).

As shown in FIG. 25, the DC to DC converter 200 comprises a pump capacitor Cp, a reservoir capacitor Cr, an inductor L, and a plurality of switching elements SW1, SW2. Specifically, a first series circuit 202 including the pump capacitor Cp and the reservoir capacitor Cr connected in series, and a second series circuit 204 including the first and second switching elements SW1, SW2 connected in series are connected to one another in parallel. A connection point p1 of the pump capacitor Cp and the reservoir capacitor Cr of the first series circuit 202, and a connection point p2 of the first and second switching elements SW1, SW2 of the second series circuit 204 are connected via the inductor L. Further, a parasitic capacitor Co is connected in parallel to the pump capacitor Cp. A load 206 is connected in parallel to the reservoir capacitor Cr.

As shown in FIG. 26, the pump capacitor Cp comprises a comb-shaped movable electrode 210 which is arranged at the center, and comb-shaped fixed electrodes 212 which are fixed on both sides of the movable electrode 210. The distance d between the movable electrode 210 and the fixed electrode 212 is changed when their comb teeth 210a, 212a make approach to or make separation from each other. Thus, the capacitance is variable.

The operation of the DC to DC converter 200 shown in FIG. 25 will be explained with reference to a timing chart shown in FIG. 27. At first, the pump capacitor Cp has the maximum value of the capacitance when the fixed electrode 212 and the movable electrode 210 make approach most closely to each other. It is assumed that the electric charge is stored in the reservoir capacitor Cr with its terminal voltage of Vdd, for example, and no electric charge is stored in the pump capacitor Cp and in the parasitic capacitor Co respectively. Further, both of the first and second switching elements SW1, SW2 are in the OFF state.

At the start of an interval t1, when the second switching element SW2 is turned ON, a ramp current (inductor current $i_L$) flows from the reservoir capacitor Cr to the inductor L in the interval t1. At the start of a next interval t2, when the first switching element SW1 is turned ON, and the second switching element SW2 is turned OFF, then the inductor current $i_L$ is supplied to the pump capacitor Cp in accordance with the energy of the inductor L in the interval t2, and the electric charge is stored in the pump capacitor Cp. In accordance with the storage of the electric charge, an output voltage Vc becomes a voltage ($V_{START}$+Vdd) obtained by adding Vdd to the terminal voltage (start voltage $V_{START}$) obtained when the capacitance of the pump capacitor Cp has the maximum value. The change to the voltage ($V_{START}$+Vdd) follows the transient characteristic depending on the time constants of the pump capacitor Cp and the inductor L.

Subsequently, at the start of an interval t3, when both of the first and second switching elements SW1, SW2 are turned OFF, then the fixed electrode 212 and the movable electrode 210 of the pump capacitor Cp are controlled in the direction to make gradual separation from each other in the interval t3, and the capacitance of the pump capacitor Cp is gradually decreased. In accordance with the change of the capacitance, the output voltage Vc is gradually increased. The interval t3 comes to end at the point of time when the capacitance of the pump capacitor Cp is minimum, and then a next interval t4 is started. At the end of the interval t3, the output voltage Vc becomes a voltage (Vmax+Vdd) obtained by adding Vdd to the terminal voltage (maximum voltage Vmax) obtained when the capacitance of the pump capacitor Cp has the minimum value.

At the start of the interval t4, when the first switching element SW1 is turned ON, the current flows in the interval t4 from the pump capacitor Cp to the inductor L. At the end of the interval t4, the output voltage Vc becomes Vdd. The change of the output voltage Vc from the voltage (Vmax+Vdd) to the voltage Vdd follows the transient characteristic depending on the time constants of the pump capacitor Cp and the inductor L. However, the voltage arrives at the voltage Vdd for a short period of time as compared with interval t2, because the capacitance of the pump capacitor Cp is minimum.

At the start of a next interval t5, when the first switching element SW1 is turned OFF, and the second switching element SW2 is turned ON, then the energy stored in the inductor L is transmitted to the reservoir capacitor Cr in the interval t5. That is, the energy (energy generated by the pump capacitor Cp), which has been increased owing to the increase in voltage in the intervals t4, t5, is recovered by the reservoir capacitor Cr.

In order to increase the capacitance change of the pump capacitor Cp in the DC to DC converter 200 described above, the following artifices are required.

(1) The gap between the comb teeth 212a of the fixed electrode 212 and the comb teeth 210a of the movable electrode 210 is decreased.

(2) The thicknesses of the fixed electrode 212 and the movable electrode 210 are increased.

(3) The lengths of the respective comb teeth 212a, 210a of the fixed electrode 212 and the movable electrode 210 are increased.

(4) The numbers of the respective comb teeth 212a, 210a of the fixed electrode 212 and the movable electrode 210 are increased.

However, when the comb teeth 212a, 210a are formed, the isotropic etching such as the wet etching is used. Therefore, when it is intended to decrease the gap between the comb teeth, it is necessary to regulate the etching depth. Then the thicknesses of the fixed electrode 212 and the movable electrode 210 are decreased, and the electrode area is decreased. In such a situation, it is impossible to expect the effect (increase of the capacitance change) to be brought about by decreasing the gap. That is, the artifices (1) and (2) are in a relation of trade-off.

The increase of the vibration frequency of the movable electrode 210 contributes to the raising of the output voltage Vc. However, if the lengths of the respective comb teeth 212a, 210a of the fixed electrode 212 and the movable electrode 210 are increased, or if the numbers of the comb teeth 212a, 210a are increased, then it is impossible to increase the vibration frequency of the movable electrode 210. That is, the artifices (3) and (4) and the vibration frequency of the movable electrode 210 are in a relation of trade-off.

Further, if the thicknesses of the fixed electrode 212 and the movable electrode 210 are increased, or if the numbers of the respective comb teeth 212a, 210a of the fixed electrode 212 and the movable electrode 210 are increased in the situation that the gap between the comb teeth cannot be decreased so much as described above, then the size of the pump capacitor Cp itself is consequently increased. That is, the artifices (2) and (4) and the miniaturization are in a relation of trade-off.

In the DC to DC converter 200 described above, the air intervenes between the fixed electrode 212 and the movable electrode 210. Further, the capacitance is changed by only the change of the distance d between the fixed electrode 212 and the movable electrode 210. Therefore, it is impossible to effectively increase the capacitance change.

SUMMARY OF THE INVENTION

The present invention has been made taking the foregoing problems into consideration, and an object thereof is to provide a DC to DC converter which makes it possible to effectively increase the capacitance change for raising the voltage and which makes it possible to increase both of the output voltage and the voltage-raising ratio even when precise machining is not performed.

The present invention lies in a DC to DC converter comprising a voltage-generating source; a first element for raising a voltage supplied from the voltage-generating source based on capacitance-varying operation performed by an actuator section; and a second element for retaining a voltage after being raised by the first element in an arbitrary polarity, wherein the first element includes a capacitance-forming component and the actuator section, and the capacitance-forming component includes a first electrode section connected to a current supply line, a second electrode section installed in the actuator section, and a dielectric member arranged between the first and second electrode sections.

Accordingly, at first, when the voltage from the voltage-generating source is supplied to the first element, then the actuator section of the first element is driven, and thus the distance between the first electrode section and the second electrode section is changed. As a result, the contact area of the dielectric member with the respective electrode sections is also changed.

It is now assumed that the distance between the electrode sections is represented by d, the contact area of the dielectric member with the respective electrode sections is represented by S, and the dielectric constant of the dielectric member is represented by $\in$. Then, a capacitance C is represented by the following expression.

$$C = \in S/d$$

In the conventional DC to DC converter, the capacitance has been changed by changing only the distance between the electrode sections. However, in the present invention, not only the distance between the electrode sections but also the contact area of the dielectric member with the respective electrode sections are changed. Therefore, it is possible to increase the capacitance change.

The dielectric member other than the air intervenes between the electrode sections. Therefore, it is unnecessary to form any precise gap between the respective electrode sections. It is possible to mitigate the various types of relations of trade-off. Thus, it is possible to effectively increase the capacitance change.

In the DC to DC converter constructed as described above, it is also preferable that the actuator section includes an operating section, a vibrating section for supporting the operating section, and a fixed section for vibratingly supporting the vibrating section, and the operating section includes a shape-retaining layer and at least a pair of electrodes to which a driving voltage is applied formed on the shape-retaining layer.

It is also preferable that the vibrating section and the fixed section are integrally formed of ceramics, and the shape-retaining layer comprises a piezoelectric/electrostrictive and/or anti-ferroelectric layer. In this configuration, it is also preferable that one electrode of the pair of electrodes of the operating section also serves as the second electrode section installed in the actuator section of the capacitance-forming component. Accordingly, it is possible to simplify the structure. Further, it is also possible to improve the driving efficiency of the actuator section. In other words, it is possible to adopt the structure in which the shape-retaining layer is interposed between the one electrode and the other electrode. The strain of the entire actuator section can be used for the displacement by applying the electric field to contribute to the strain over the entire actuator section.

It is also preferable that an insulating layer is allowed to intervene between one electrode of the pair of electrodes of the operating section and the second electrode section installed in the actuator section of the capacitance-forming component. That is, the insulating layer intervenes between the capacitance-forming component and the actuator section. The electric potential of the electrode of the actuator section can be set irrelevant to the capacitance-forming component. Therefore, it is possible to maximize the displacement obtained by applying an optimum driving voltage for the actuator section.

It is preferable that the dielectric member is made of a member having elasticity. Accordingly, it is possible to efficiently change the distance between the first electrode section and the second electrode section of the capacitance-forming component and the contact area of the dielectric member with the respective electrode sections, respectively, by driving the actuator section. It is possible to increase the capacitance change in the capacitance-forming component. Especially, when a ferroelectric filler is contained in the member, it is possible to increase the dielectric constant of the dielectric member, and it is possible to further increase the capacitance change.

It is also preferable that a member having a dielectric constant different from a dielectric constant of the dielectric member and having fluidity is arranged at least around the dielectric member. Accordingly, when the dielectric member is separated from the first electrode section of the capacitance-forming component in accordance with the driving action of the actuator section, for example, the member having fluidity flows into a formed gap. The dielectric member and the member having fluidity intervene between the first electrode section and the second electrode section. As a result, the dielectric constant between the first electrode section and the second electrode section is changed. It is possible to further facilitate the increase of the capacitance change by the change of the dielectric constant.

In the present invention, it is also preferable that the DC to DC converter further comprises a first switching element for selectively introducing the voltage from the voltage-generating source to the first element based on a first control signal; and a second switching element for selectively introducing the voltage after being raised by the first element to the second element based on a second control signal.

In this configuration, it is also preferable that the DC to DC converter further comprises a third switching element for selectively supplying a reference voltage and a first voltage different from the reference voltage to the actuator section based on a third control signal.

Accordingly, for example, when the voltage from the voltage-generating source is introduced into the first element by the first switching element, the capacitance of the capacitance-forming component is changed in accordance with the displacement action of the actuator section by supplying, for example, the first voltage to the actuator section by the third switching element. The voltage supplied from the voltage-generating source is raised based on the capacitance change. After that, the raised voltage is introduced into the second element by the second switching element. For example, the voltage from the voltage-generating source can be used for the first voltage different from the reference voltage.

In the DC to DC converter constructed as described above, it is also preferable that the third switching element becomes a stopped state when the voltage retained by the second element arrives at a predetermined voltage, and the DC to DC converter further comprises a fourth switching element for selectively supplying the reference voltage and a second voltage different from the reference voltage to the actuator section based on a fourth control signal. In this configuration, it is also preferable that the voltage retained by the second element is used for the second voltage different from the reference voltage.

Accordingly, it is possible to provide a plurality of stages of the change, i.e., the capacitance change based on the first voltage and the capacitance change based on the second voltage as the capacitance change in the actuator section. Further, the voltage obtained at the voltage-generating source and the voltage retained by the second element may be used as the first and second voltages. Therefore, it is unnecessary to provide any power source circuit system for newly generating the voltage. It is possible to simplify the circuit configuration and the apparatus configuration.

In the present invention, it is also preferable that each of the switching elements comprises a piezoelectric relay having a switching actuator section, and the switching actuator section includes a shape-retaining layer, an operating section having at least a pair of electrodes formed on the shape-retaining layer, a vibrating section for supporting the operating section, and a fixed section for vibratingly supporting the vibrating section.

Accordingly, it is possible to decrease the ON resistance of the switching element. Further, it is possible to realize the high speed switching operation. Therefore, it is possible to obtain the DC to DC converter having a compact size, a high output, and a high efficiency.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a sequence table (No. 2) illustrating the operation of the DC to DC converter according to the embodiment of the present invention;

FIG. 8 shows a first exemplary configuration in which a plurality of sets of capacitance-forming components and actuator sections are provided as the first element;

FIG. 9 shows that the first voltage is applied to all of the actuator sections in the first exemplary configuration shown in FIG. 8;

FIG. 24 is a sequence table (No. 2) illustrating the operation of the DC to DC converter according to the sixth modified embodiment;

DESCRIPTION OF THE PREFERRED EMBODIMENTS

Explanation will be made below with reference to FIGS. 1 to 24 for several illustrative embodiments in which the DC to DC converter according to the present invention is applied, for example, to a DC to DC converter based on the use of a charge pump.

Figure 1:
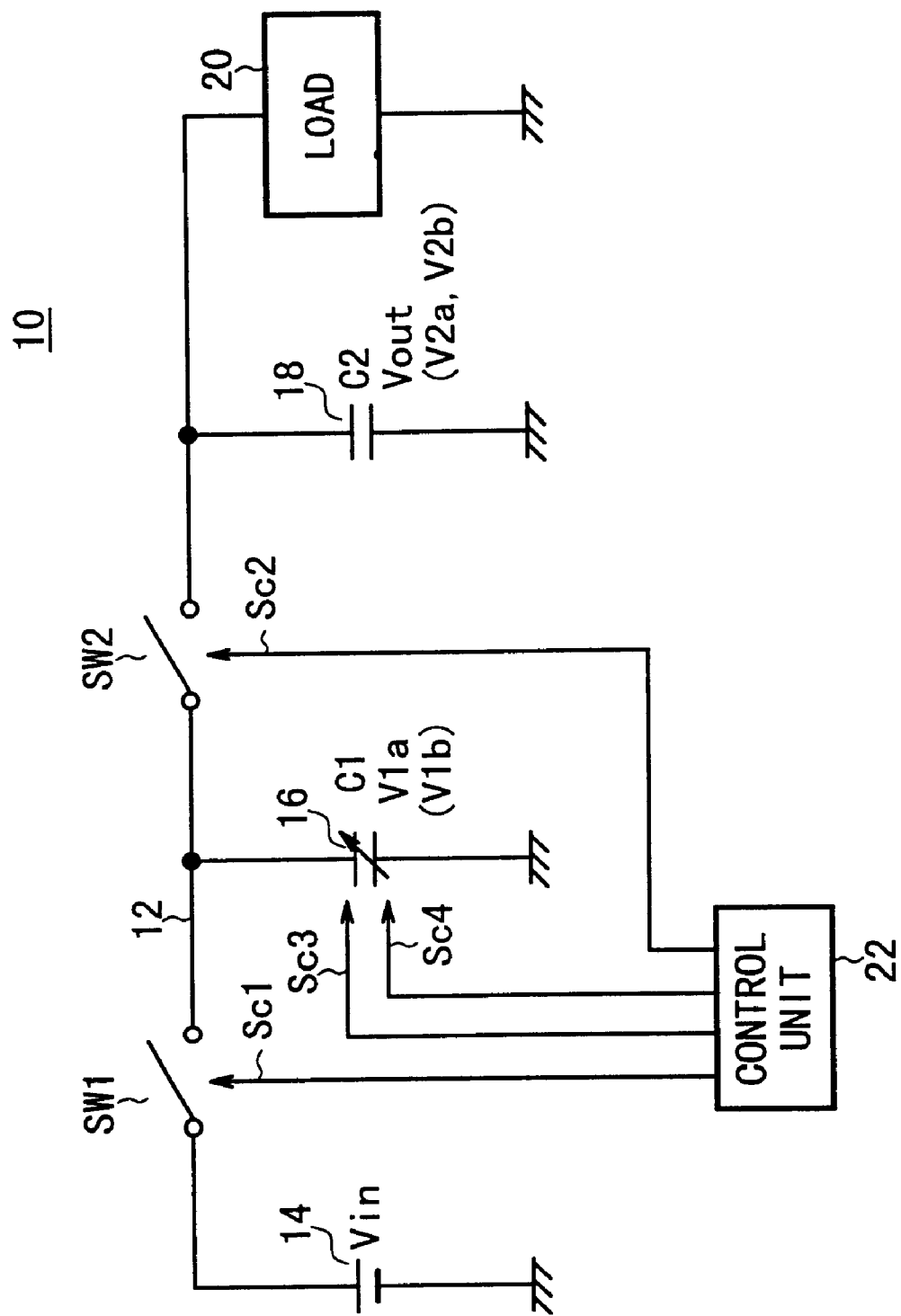
FIG. 1 is a circuit diagram illustrating a configuration of a DC to DC converter according to an embodiment of the present invention.

At first, as shown in FIG. 1, the DC to DC converter 10 according to an embodiment of the present invention comprises a voltage-generating source 14, a first element 16, and a second element 18 which are connected in parallel respectively between a current supply line 12 and the ground.

The voltage-generating source 14 may be constructed with a power source, for example, as shown in FIG. 1. Alternatively, the voltage-generating source 14 may be also constructed with a capacitor in which a predetermined amount of charge is stored.

Figure 2:
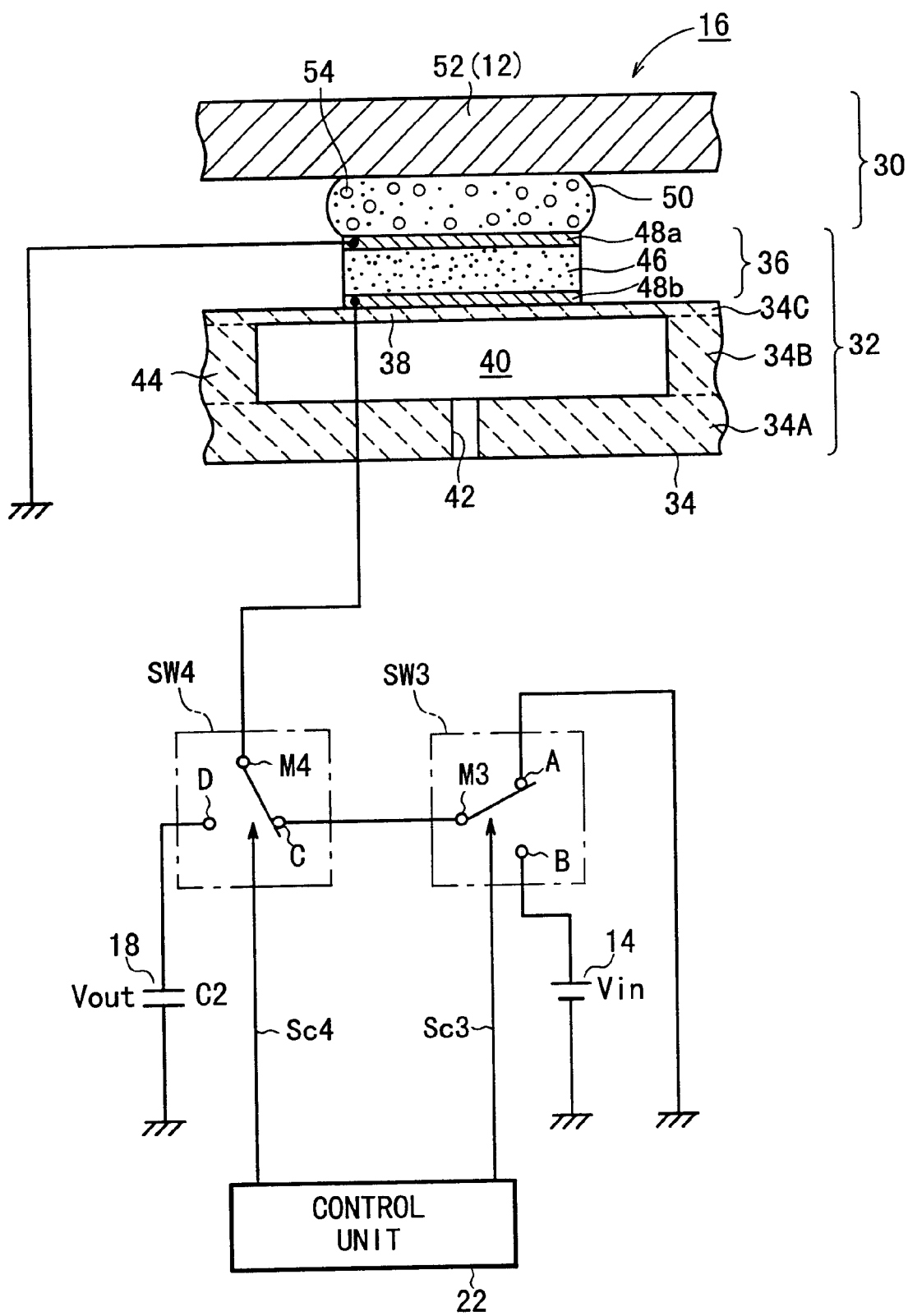
FIG. 2 shows a configuration illustrating a case that an actuator section is in a neutral state in a first element of the DC to DC converter according to the embodiment of the present invention.

The first element 16 raises the voltage Vin supplied from the voltage-generating source 14 based on the capacitance-varying operation of a capacitance-forming component 30 by the displacement action of an actuator section 32 (see FIG. 2). In FIG. 1, the first element 16 is equivalently depicted by a capacitor Cl. Detailed configuration thereof will be described later on.

The second element 18 retains, in an arbitrary polarity, the voltage after being raised by the first element 16. The second element 18 is constructed, for example, by a capacitor C2. The capacitance of the capacitor C2 of the second element 18 is constant, and it is set to be considerably larger than the maximum capacitance Cmax of the capacitor Cl of the first element 16 (Cmax<<C2). A load 20 is connected in parallel to the second element 18. The terminal voltage of the capacitor C2 of the second element 18 is applied to the load.

The DC to DC converter 10 includes a first switching element SW1 which is inserted and connected between the voltage-generating source 14 and the first element 16 in the current supply line 12. The first switching element SW1 is provided so that the voltage Vin supplied from the voltage-generating source 14 is selectively led to the first element 16 based on a first control signal Sc1 from a control unit 22. A second switching element SW2 is inserted and connected between the first element 16 and the second element 18. The second switching element SW2 is provided so that the voltage after being raised by the first element 16 is selectively led to the second element 18 based on a second control signal Sc2 from the control unit 22.

Next, the first element 16 will be explained with reference to FIG. 2. As shown in FIG. 2, the first element 16 comprises a capacitance-forming component 30 and an actuator section 32.

The actuator section 32 has an operating section 36 which is formed on an actuator substrate 34 of ceramics, for example. A hollow space 40 is defined in the actuator substrate 34 to form a vibrating section 38 at a position corresponding to the capacitance-forming component 30. The hollow space 40 communicates with the outside via a through-hole 42 having a small diameter provided in another surface of the actuator substrate 34.

The actuator substrate 34 has a thin-walled portion where the hollow space 40 is formed. The other portion of the actuator substrate 34 is thick-walled. The thin-walled portion has a structure which tends to undergo the vibration with respect to the external stress, and it functions as the vibrating section 38. The portion other than the hollow space 40 is thick-walled and functions as a fixed section 44 for supporting the vibrating section 38.

In other words, the actuator substrate 34 is a stack comprising a substrate layer 34A as a lowermost layer, a spacer layer 34B as an intermediate layer, and a thin plate layer 34C as an uppermost layer. The actuator substrate 34 may be recognized as an integrated structure including the hollow space 40 which is formed at the portion of the spacer layer 34B corresponding to the actuator section 32. The substrate layer 34A functions as a reinforcing substrate and also functions as a substrate for wiring. The actuator substrate 34 may be sintered in an integrated manner, or it may be additionally provided.

The actuator section 32 comprises, as well as the vibrating section 38 and the fixed section 44, the operating section 36 which is directly formed on the vibrating section 38. The operating section 36 includes a shape-retaining layer 46 which is, for example, a piezoelectric/electrostrictive layer or an anti-ferroelectric layer, and a pair of electrodes 48 (upper electrode 48a and lower electrode 48b) which are formed on upper and lower surfaces of the shape-retaining layer 46, respectively.

The capacitance-forming component 30 comprises the upper electrode 48a of the actuator section 32, a dielectric member 50 serving as a displacement-transmitting section formed on the upper electrode 48a, and an electrode section 52 of, e.g., a metal plate connected to the current supply line 12.

The dielectric member 50 is made of a member having elasticity and a ferroelectric filler 54 is contained therein.

When a voltage which is similar to a voltage applied to polarize the shape-retaining layer 46 is applied between the pair of electrodes 48a, 48b, the electric field-induced strain is generated in the shape-retaining layer 46. The shape-retaining layer 46 makes bending displacement in accordance with the lateral effect of the electric field-induced strain so that the shape-retaining layer 46 is convex toward the hollow space (see FIG. 3). Of course, it is also possible to bend the actuator section 32 in another direction so that the actuator section 32 is convex toward the capacitance-forming component 30. The state of the actuator section 32 in which a reference voltage (for example, 0 V) is applied to the actuator section 32 is referred to as a "neutral state."

Further, the upper electrode 48a of the operating section 36 is grounded. A third switching element SW3 is selectively connected to the lower electrode 48b through a fourth switching element SW4.

The third switching element SW3 has a movable contact M3 movable based on a third control signal Sc3 from the control unit 22, a first fixed contact A which is grounded, and a second fixed contact B connected to the voltage-generating source 14. The fourth switching element SW4 has a movable contact M4 movable based on a fourth control signal Sc4 from the control unit 22, a first fixed contact C connected to the movable contact M3 of the third switching element SW3, and a second fixed contact D connected to the second element 18.

Therefore, when the movable contact M4 of the fourth switching element SW4 is connected to the first fixed contact C to select the third switching element SW3, the lower electrode 48b of the actuator section 32 has the ground electric potential Vss, for example, while the movable contact M3 of the third switching element SW3 is connected to the first fixed contact A. Therefore, a reference voltage Vb (in this case, 0 V) is applied to the actuator section 32, and the actuator section 32 maintains the neutral state. When the distance between the upper electrode 48a and the electrode section 52 of the capacitance-forming component 30 is minimum in accordance with the neutral state, the capacitance C1 of the first element 16 is the maximum value Cmax.

When the third switching element SW3 is selected by the fourth switching element SW4, the lower electrode 48b of the actuator section 32 has the electric potential Vin of the voltage-generating source 14 while the movable contact M3 of the third switching element SW3 is connected to the second fixed contact B. Therefore, a first voltage Va1 is applied to the actuator section 32 and the actuator section 32 becomes convex toward the hollow space 40. The distance between the upper electrode 48a and the electrode section 52 of the capacitance-forming component 30 is increased by a distance corresponding to the first voltage Va1. As a result of the displacement action of the actuator section 32, the capacitance C1 of the first element 16 is decreased, and the terminal voltage of the first element 16 is raised.

The lower electrode 48b has an electric potential Vout of the second element 18 while the movable contact M4 of the fourth switching element SW4 is connected to the second fixed contact D (in this period, the third switching element SW3 is in the OFF state). Therefore, a second voltage Va2 is applied to the actuator section 32 and the actuator section 32 becomes convex toward the hollow space 40. The distance between the electrode section 52 and the upper electrode 48a is increased by a distance corresponding to the second voltage Va2. When the second voltage Va2 is higher than the first voltage Va1, the capacitance C1 of the first element 16 is further decreased in accordance with the displacement action of the actuator section 32. Accordingly, the terminal voltage of the first element 16 is further raised.

As described above, when the first voltage Va1 or the second voltage Va2 is applied to the actuator section 32 and the actuator section 32 is displaced, the distance between the electrode section 52 of the capacitance-forming component 30 and the upper electrode 48a of the operating section 36 is changed, and the contact area of the dielectric member 50 with the electrode section 52 is also changed.

It is assumed that d represents the distance between the electrode section 52 and the upper electrode 48a, S represents the contact area of the dielectric member 50 with the electrode section 52, and $\in$ represents the dielectric constant of the dielectric member 50. On this assumption, a capacitance C is represented by the following expression.

$$C = \in S/d$$

In the case of the conventional DC to DC converter, the capacitance C has been changed by changing only the distance between the electrodes of a capacitor C. However, in this embodiment, not only the distance between the electrode section 52 and the upper electrode 48a but also the contact area of the dielectric member 50 with the electrode section 52 is changed. Therefore, it is possible to increase the capacitance change.

Figure 3:
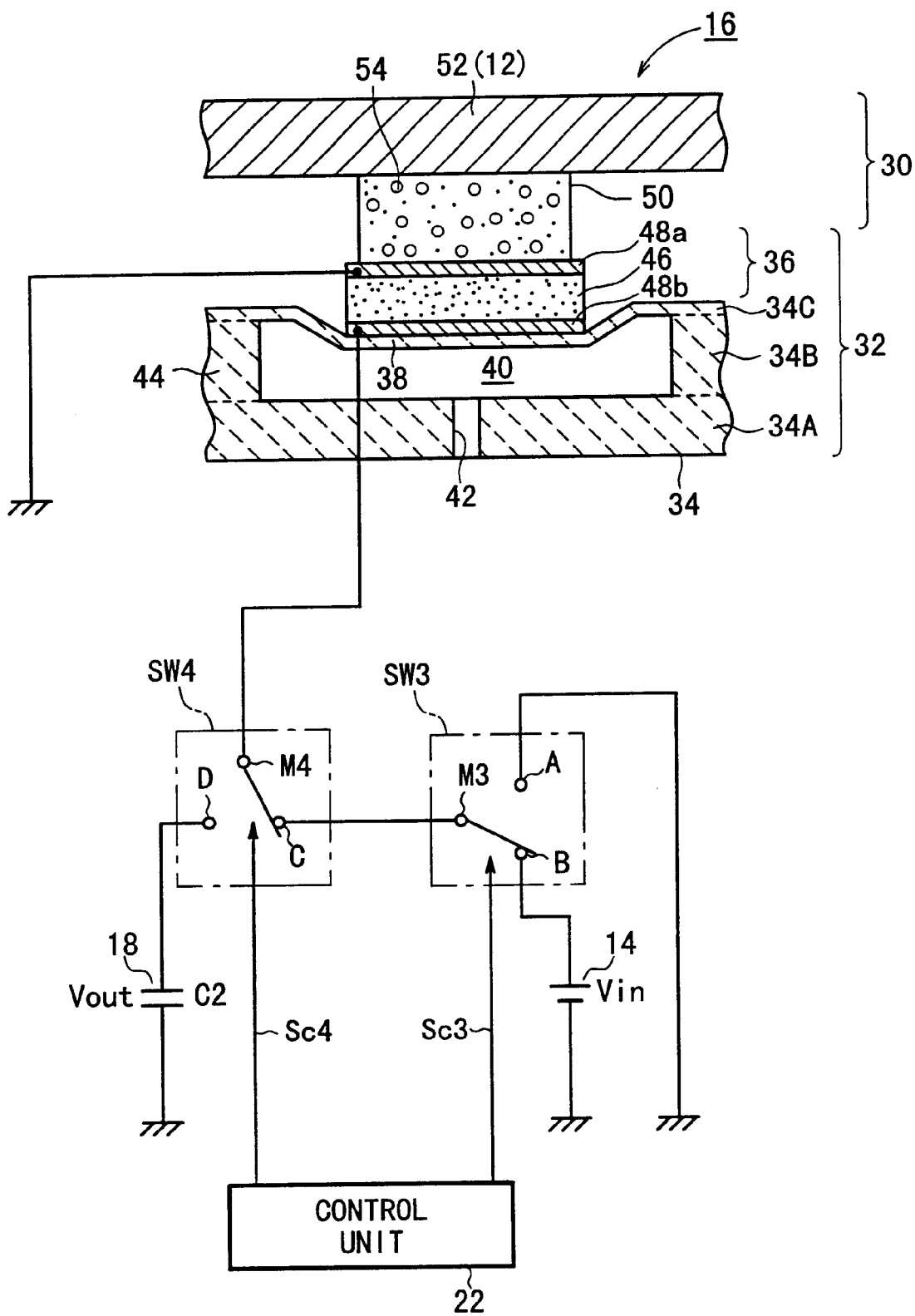
FIG. 3 shows a configuration illustrating a case that a first voltage is applied to the actuator section in the first element of the DC to DC converter according to the embodiment of the present invention.
Figure 4:
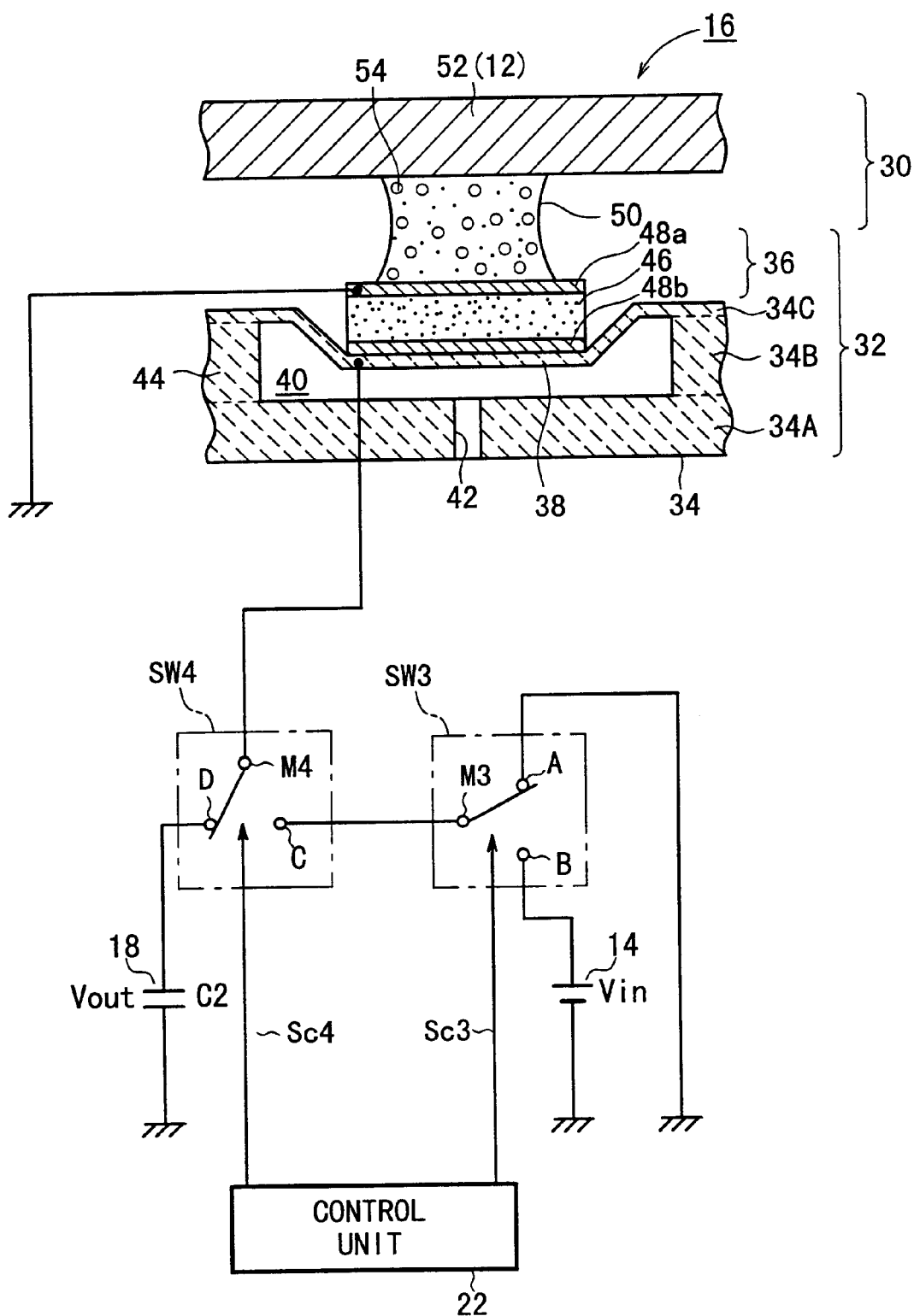
FIG. 4 shows a configuration illustrating a case that a second voltage is applied to the actuator section in the first element of the DC to DC converter according to the embodiment of the present invention.

Next, the operation of the DC to DC converter 10 according to the first embodiment will be explained with reference to the concept of operation in FIGS. 2 to 4 and the sequence table in FIGS. 5 and 6. In order to clarify the explanation concerning voltages, the terminal voltages of the first element 16 and the second element 18 from an interval t1 to an interval t7 are referred to as V1a and V2a, respectively, and the terminal voltages of the first element 16 and the second element 18 from an interval t9 to an interval t16 are referred to as V1b and V2b, respectively.

At first, in the initial state (an interval t0 in FIG. 5), the control unit 22 makes all of the first to fourth control signals Sc1 to Sc4 the low level. Therefore, both of the first and second switching elements SW1, SW2 are in the OFF state. Further, the third switching element SW3 is selected by the fourth switching element SW4, and the ground electric potential Vss is selected by the third switching element SW3. Accordingly, as shown in FIG. 2, the reference voltage Vb is applied to the actuator section 32, and the actuator section 32 maintains the neutral state. The capacitance C1 of the first element 16 is the maximum value Cmax.

Starting from this state, the control unit 22 makes at the start of the interval t1 the first control signal Sc1 the high level, and makes the first switching element SW1 the ON state. Accordingly, in the interval t1, the current from the voltage-generating source 14 flows through the first element 16, and the electric charge is stored in the first element 16. In the interval t1, the terminal voltage V1a of the first element 16 is the same as the terminal voltage Vin of the voltage-generating source 14.

At the point of time (the start of an interval t2) when the terminal voltage V1a of the first element 16 becomes the terminal voltage Vin of the voltage-generating source 14, the control unit 22 makes the first control signal Sc1 the low level, and makes the first switching element SW1 the OFF state. Accordingly, the current does not flow from the first element 16 to the other elements (for example, the voltage-generating source 14 and the second element 18). Since the current is stopped in the interval t2, the terminal voltage V1a of the first element 16 is retained to be Vin.

At the point of time (the start of an interval t3) when a predetermined period of time elapses from the start of the interval t2, the control unit 22 makes the third control signal Sc3 the high level, and selects the electric potential Vin of the voltage-generating source 14 by the third switching element SW3. As a result of the selection, the first voltage Va1 is applied to the actuator section 32. As shown in FIG. 3, the actuator section 32 is displaced and becomes convex toward the hollow space 40. The distance between the upper electrode 48a and the electrode section 52 of the capacitance-forming component 30 is increased by a distance corresponding to the first voltage Va1. The contact area of the dielectric member 50 with the electrode section 52 is reduced in an amount corresponding to the first voltage Va1. As a result, the capacitance C1 of the first element 16 is decreased (C1=C1a), and the terminal voltage V1a of the first element 16 is increased corresponding thereto (V1a= Q/C1a>Vin).

At the point of time (the start of an interval t4) when the terminal voltage V1a of the first element 16 becomes a first prescribed voltage Vc1, the control unit 22 makes a second control signal Sc2 the high level, and makes the second switching element SW2 the ON state. It is noted that the first prescribed voltage Vc1 refers to the theoretical terminal voltage of the first element 16 obtained when the first voltage Va1 is applied to the actuator section 32 and the actuator section 32 is displaced.

Accordingly, in the interval t4, the current flows from the first element 16 to the second element 18. The electric charge is stored in the second element 18. In the interval t4, the terminal voltage V2a of the second element 18 is the same as the terminal voltage V1a of the first element 16. The voltage V1a is retained to be higher than the voltage Vin of the voltage-generating source 14. The voltage V1a is applied to the load 20.

At the point of time (the start of an interval t5) when the second control signal Sc2 is at the high level and the terminal voltage V2a of the second element 18 becomes approximately the same as the terminal voltage V1a of the first element 16 at present, the control unit 22 makes the second control signal Sc2 the low level, and makes the second switching element SW2 the OFF state. In the interval t5, the second element 18 is electrically separated from the first element 16. Therefore, the second element 18 serves as a pseudo power source having the voltage corresponding to the electric charge stored in the second element 18. The electric power is supplied to the load 20.

At the point of time (the start of an interval t6) when a predetermined period of time elapses from the interval t5, the control unit 22 makes the third control signal Sc3 the low level, and selects the ground electric potential Vss by the third switching element SW3. Accordingly, the reference voltage Vb is applied to the actuator section 32. Therefore, the actuator section 32 is restored to the neutral state, and the capacitance C1 of the first element 16 becomes the maximum value Cmax again.

Subsequently, the control unit 22 judges whether or not the second control signal Sc2 is at the low level (second switching element SW2 is in the OFF state) and the terminal voltage V2a of the second element 18 is not less than the first prescribed voltage Vc1.

If the terminal voltage V2a of the second element 18 is less than the first prescribed voltage Vc1, the control unit 22 repeats the processes for the interval t1 and the followings again. As a result of the repeated processes, the electric charge is successively stored in the second element 18. The terminal voltage V2a of the second element 18 obtained when the second switching element SW2 is in the OFF state becomes the first prescribed voltage Vc1.

At the start of an interval t11 shown in FIG. 6, the control unit 22 makes the first control signal Sc1 the high level, and makes the first switching element SW1 the ON state. Accordingly, in the interval t11, the terminal voltage V1b of the first element 16 is the same as the terminal voltage Vin of the voltage-generating source 14.

At the point of time (the start of an interval t12) when the terminal voltage V1b of the first element 16 becomes the terminal voltage Vin of the voltage-generating source 14, the control unit 22 makes the first control signal Sc1 the low level, and makes the first switching element SW1 the OFF state. Accordingly, the current does not flow from the first element 16 to the other elements (for example, the voltage-generating source 14 and the second element 18). Since the current is stopped in the interval t12, the terminal voltage V1b of the first element 16 is retained to be Vin.

At the point of time (the start of an interval t13) when a predetermined period of time elapses from the start of the interval t12, the control unit 22 makes the fourth control signal Sc4 the high level, and selects the electric potential Vout of the second element 18 by the fourth switching element SW4. As a result of the selection, the second voltage Va2 (>Va1) is applied to the actuator section 32. As shown in FIG. 4, the actuator section 32 is displaced and the actuator section 32 becomes convex toward the hollow space 40. The distance between the upper electrode 48a and the electrode section 52 of the capacitance-forming component 30 is increased by a distance corresponding to the second voltage Va2 (the distance is longer than that obtained with the first voltage Va1). The contact area S of the dielectric member 50 with the electrode section 52 is reduced in an amount corresponding to the second voltage Va2. As a result, the capacitance C1 of the first element 16 is decreased (C1=C1b) as compared with the case that the first voltage Va1 is applied, and the terminal voltage V1b (>V1a) of the first element 16 is further increased corresponding thereto.

At the point of time (the start of an interval t14) when the terminal voltage V1b of the first element 16 becomes a second prescribed voltage Vc2, the control unit 22 makes the second control signal Sc2 the high level, and makes the second switching element SW2 the ON state. It is noted that the second prescribed voltage Vc2 refers to the theoretical terminal voltage of the first element 16 to be obtained when the second voltage Va2 is applied to the actuator section 32 and the actuator section 32 is displaced.

Accordingly, in the interval t14, the current flows from the first element 16 to the second element 18. The electric charge is stored in the second element 18. In the interval t14, the terminal voltage V2b of the second element is the same as the terminal voltage V1b of the first element 16. The voltage V1b is retained to be higher than the terminal voltage V1a of the first element 16 in the interval t4 shown in FIG. 5. The voltage V1b is applied to the load.

At the point of time (the start of an interval t15) when the second control signal Sc2 is at the high level and the terminal voltage V2b of the second element 18 is approximately the same as the terminal voltage V1b of the first element 16 at present, the control unit 22 makes the second control signal Sc2 the low level, and makes the second switching element SW2 the OFF state. In the interval t15, the second element 18 is electrically separated from the first element 16. Therefore, the second element 18 serves as a pseudo power source having the voltage corresponding to the electric charge stored in the second element 18. The electric power is supplied to the load 20.

At the point of time (the start of the interval t16) when a predetermined period of time elapses from the interval t15, the control unit 22 makes the fourth control signal Sc4 the low level, and selects the ground electric potential Vss by the third switching element SW3. Accordingly, the reference voltage Vb is applied to the actuator section 32. Therefore, the actuator section 32 is restored to the neutral state, and the capacitance C1 of the first element 16 becomes the maximum value Cmax again. After that, the processes from the interval t11 to the interval t16 are repeated. The electric charge is successively stored in the second element 18 in accordance with the repeated processes. The terminal voltage V2a of the second element 18 obtained when the second switching element SW2 is in the OFF state becomes the second prescribed voltage Vc2.

As described above, the DC to DC converter 10 according to the embodiment of the present invention comprises the voltage-generating source 14; the first element 16 for raising the voltage Vin supplied from the voltage-generating source 14 based on the capacitance-varying operation performed by the actuator section 32; and the second element 18 for retaining the voltage after being raised by the first element 16 in an arbitrary polarity. The first element 16 includes the capacitance-forming component 30 and the actuator section 32. The capacitance-forming component 30 includes the electrode section 52 connected to the current supply line 12, the upper electrode 48a of the actuator section 32, and the dielectric member 50 arranged between the electrode section 52 and the upper electrode 48a.

Accordingly, at first, when the voltage Vin from the voltage-generating source 14 is supplied to the first element 16, the actuator section 32 of the first element 16 is driven. Thus, not only the distance between the electrode section 52 and the upper electrode 48a but also the contact area S of the dielectric member 50 with the electrode section 52 is changed. Therefore, it is possible to increase the capacitance change.

The dielectric member 50 other than the air intervenes between the electrode section 52 and the upper electrode 48a. Therefore, it is unnecessary to form any precise gap between the electrode section 52 and the upper electrode 48a. It is possible to mitigate the various types of tradeoff. Thus, it is possible to effectively increase the capacitance change.

Further, in the first embodiment, the vibrating section 38 and the fixed section 44 are integrally formed of ceramics, and the shape-retaining layer 46 is made of a piezoelectric/electrostrictive layer and/or an anti-ferroelectric layer. Further, the upper electrode 48a of the pair of electrodes 48a, 48b of the operating section 36 also serves as the electrode of the capacitance-forming component 30. Accordingly, it is possible to simplify the structure. It is possible to improve the driving efficiency of the actuator section 32 as well. In other words, the actuator section 32 adopts the structure in which the shape-retaining layer 46 is interposed between the upper electrode 48a and the lower electrode 48b. The strain of the entire actuator section 32 can be used as the displacement by applying the electric field to cause the strain over the entire actuator section 32.

Especially, in the first embodiment, the dielectric member 50 is made of a member having elasticity. Accordingly, it is possible to efficiently change the distance between the upper electrode 48a and the electrode section 52 of the capacitance-forming component 30 and the contact area S of the dielectric member 50 with the electrode section 52, respectively, by driving the actuator section 32. It is possible to increase the capacitance change in the capacitance-forming component 30. Further, in this embodiment, the ferroelectric filler 54 is contained in the dielectric member 50. Therefore, it is possible to increase the dielectric constant of the dielectric member 50, and it is possible to increase the capacitance change.

Figure 7A:
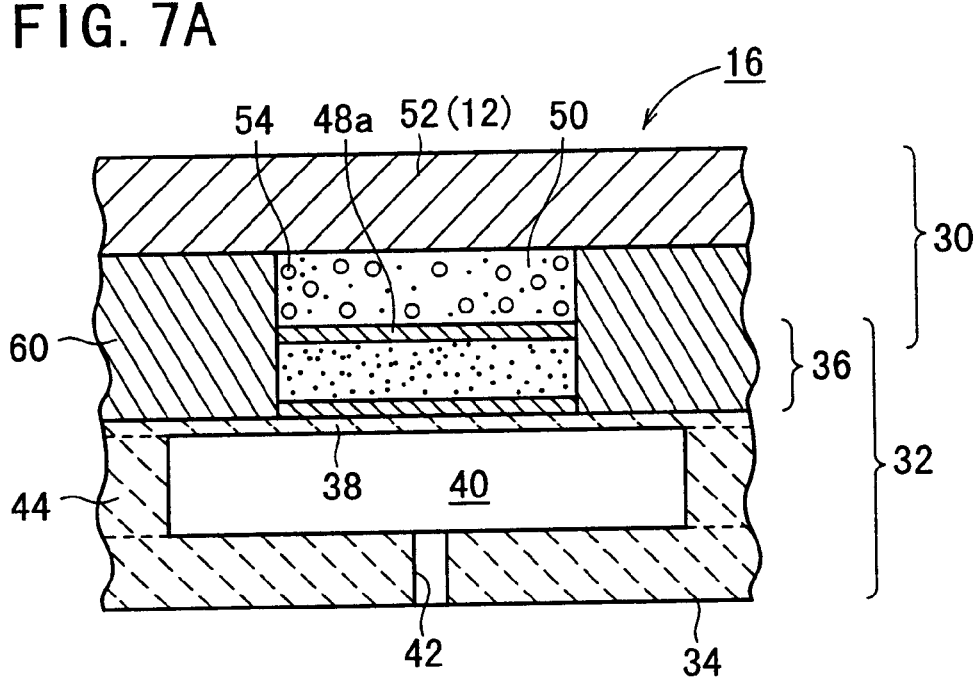
FIG. 7A shows a configuration illustrating a case that the space around a capacitance-forming component is filled with a member having fluidity.
Figure 7B:
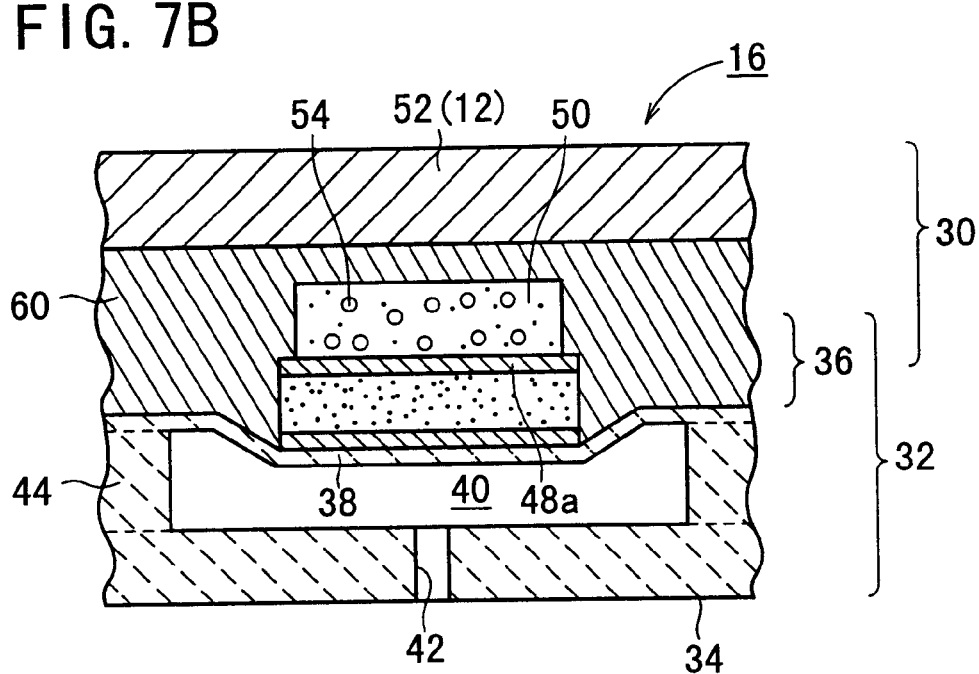
FIG. 7B illustrates the action effected when a dielectric member of the capacitance-forming component is separated from an electrode section.

In the first embodiment, one type of the dielectric member is used as the dielectric member 50 of the capacitance-forming component 30. Alternatively, as shown in FIG. 7A, a member having good release performance may be used for the dielectric member 50, and a member 60 having a dielectric constant different from the dielectric constant of the dielectric member 50 and having fluidity may be arranged at least around the dielectric member 50. Accordingly, as shown in FIG. 7B, for example, when the dielectric member 50 is separated from the electrode section 52 of the capacitance-forming component 30 in accordance with the driving operation of the actuator section 32, the member 60 having fluidity flows into a gap formed thereby. The dielectric member 50 and the member 60 having fluidity intervene between the electrode section 52 and the upper electrode 48a. As a result, the dielectric constant between the electrode section 52 and the upper electrode 48a is changed. Owing to the change of the dielectric constant, it is possible to further facilitate the increase of the capacitance change.

In the embodiment described above, the first element 16 is made of the set of the capacitance-forming component 30 and the actuator section 32. Alternatively, as shown in FIGS. 8 to 11, the first element 16 may be made of a plurality of sets of capacitance-forming components 30A to 30C and actuator sections 32A to 32C.

In this case, a third switching element SW3 and a fourth switching element SW4 may be provided so that an identical voltage is applied at the same timing to all of the actuator sections 32A to 32C of the first element 16.

FIG. 9 shows that the first voltage Va1 is applied to the respective actuator sections 32A to 32C by applying the voltage Vin from the voltage-generating source 14 to the lower electrodes 48b of the respective actuator sections 32A to 32C by the third switching element SW3 and the fourth switching element SW4.

Figure 10:
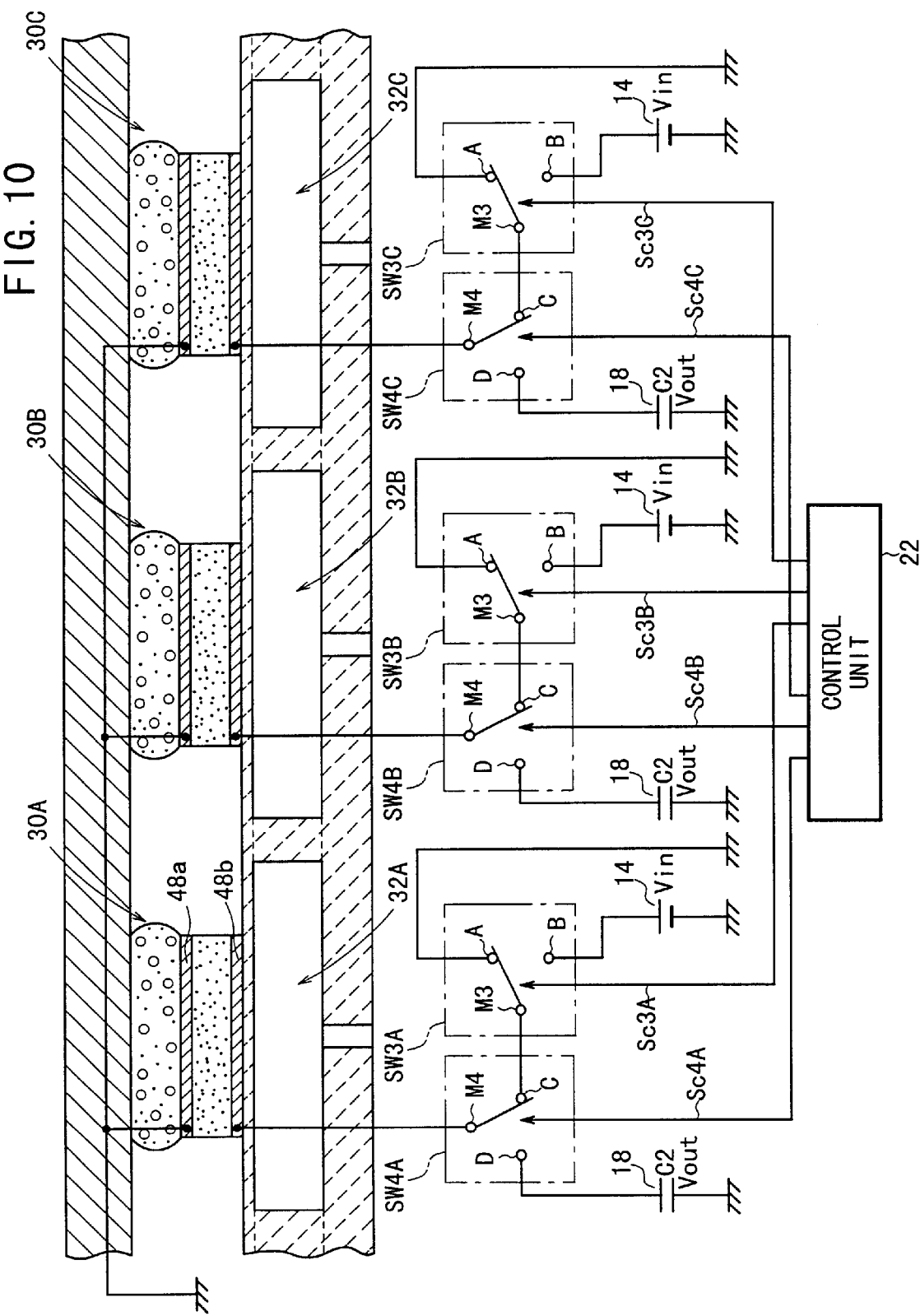
FIG. 10 shows a second exemplary configuration in which a plurality of sets of capacitance-forming components and actuator sections are provided as the first element.

Alternatively, as shown in FIG. 10, a plurality of third switching elements SW3A to SW3C and a plurality of fourth switching elements SW4A to SW4C may be provided corresponding to respective actuator sections 32A to 32C. First address signals (Sc3A to Sc3C) outputted in parallel to the plurality of third switching elements SW3A to SW3C may be used as the third control signal Sc3. Second address signals (Sc4A to Sc4C) outputted in parallel to the plurality of fourth switching elements SW4A to SW4C may be used as the fourth control signal Sc4. In this case, the actuator section 32A, 32B, or 32C to be displaced can be arbitrarily selected with the first address signals (Sc3A to Sc3C) and second address signals (Sc4A to Sc4C). The change of the capacitance C1 in the first element 16 can be set to have an arbitrary range. As a result, the raising level of the voltage can be arbitrarily set depending on the load and the circuit constant of the circuit system. It is possible to realize versatile use of the DC to DC converter 10.

Figure 11:
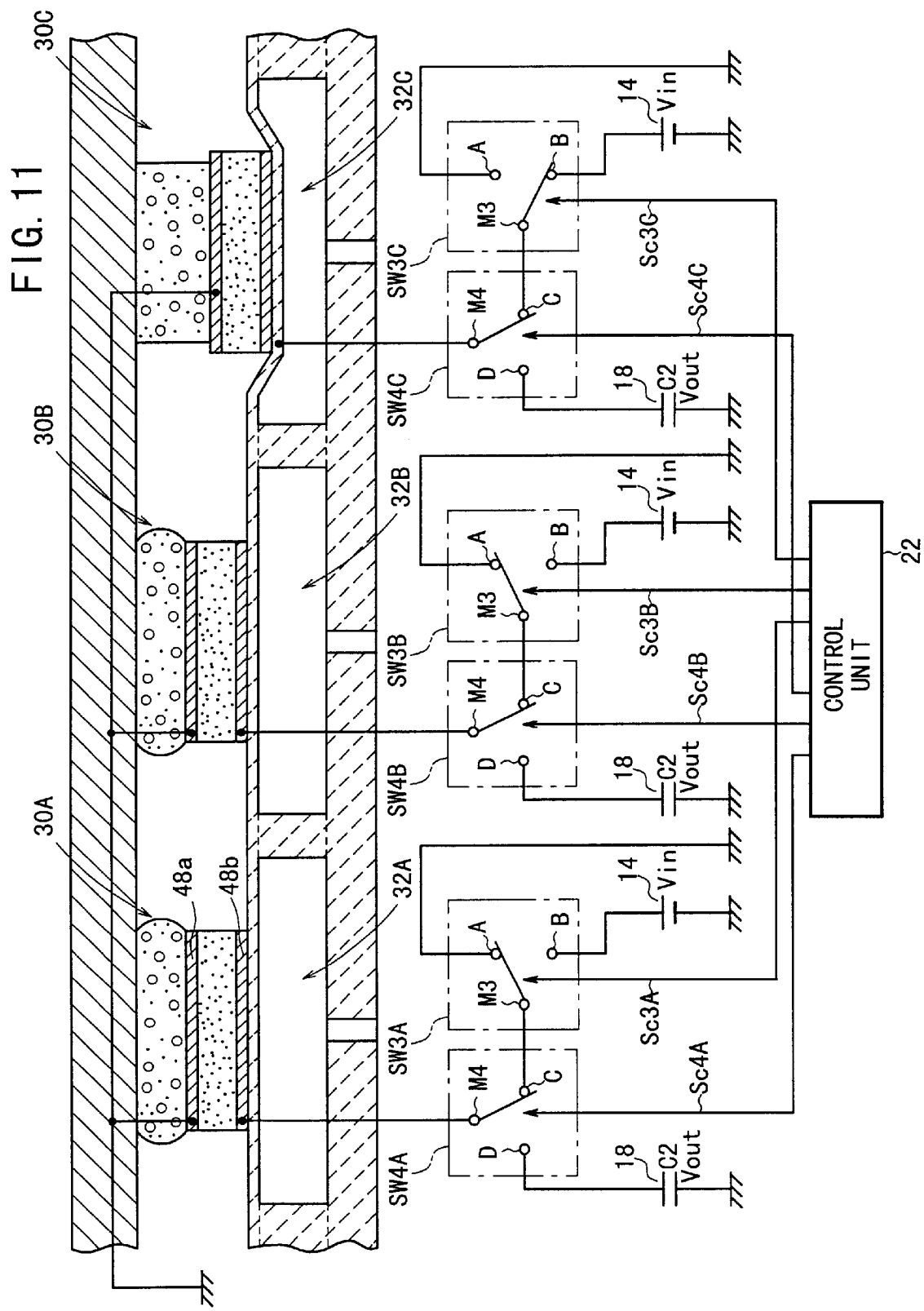
FIG. 11 shows that the first voltage is applied to the third actuator section in the second exemplary configuration shown in FIG. 10.

FIG. 11 shows that the reference voltage Vb is applied to the first and second actuator sections 32A, 32B by the first and second third switching elements SW3A, SW3B and the first and second fourth switching elements SW4A, SW4B, and the first voltage Va1 is applied to the third actuator section 32C by the third third switching element SW3C and the third fourth switching element SW4C.

An SSR (solid state relay) or an MOS relay may be used for the first and second switching elements SW1, SW2 and for the third and fourth switching elements SW3, SW4.

Figure 12:
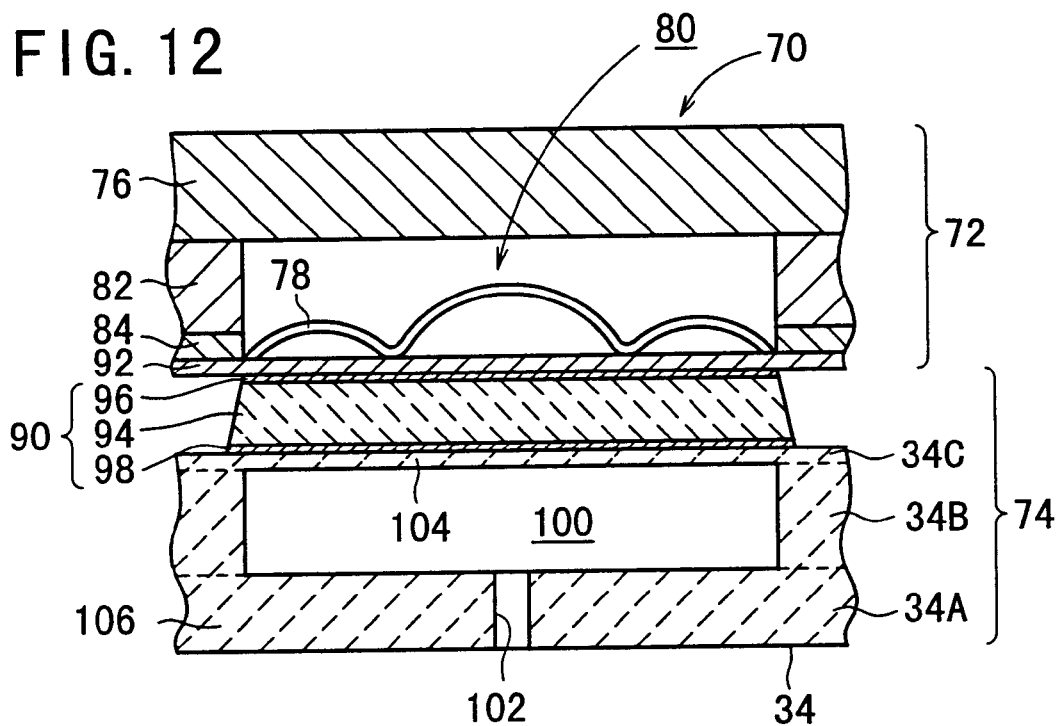
FIG. 12 shows a configuration illustrating the OFF state for first and second switching elements.

Especially, as shown in FIG. 12, each of the first and second switching elements SW1, SW2 may be constituted by a piezoelectric relay 70. The piezoelectric relay 70 comprises a contact section 72 arranged at an upper portion, and an actuator section 74 arranged at a lower portion.

The contact section 72 comprises a terminal plate 76 which constitutes a fixed contact for the switching element SW1 or SW2, and a plate spring 78 which constitutes a movable contact for the switching element SW1 or SW2.

The terminal plate 76 is installed on the upper surface of a substrate 82 having a window 80 so that the window 80 is closed thereby. The plate spring 78 is arranged in the window 80 so that the plate spring 78 is opposed to the lower surface of the terminal plate 76. Ends of the plate spring 78 contact with a metal member 84 (including a metal plate or a metal layer) provided on the lower surface of the substrate 82. The current will flow through the plate spring 78 to the metal member 84.

The actuator section 74 comprises an operating section 90 for energizing the contact section 72 to perform ON/OFF operation. The actuator section 74 is provided under the plate spring 78 with an insulating sheet 92 intervening therebetween. The operating section 90 includes a shape-retaining layer 94, and an upper electrode 96 and a lower electrode 98 provided on the upper and lower surfaces of the shape-retaining layer 94. A stack of these components is formed, for example, on the same actuator substrate 34 of the first element 16 described above. Of course, the stack may be provided on another actuator substrate. However, when the stack is provided on the same actuator substrate 34, it is possible to obtain the same temperature characteristics and it is possible to reduce the installation area for the first element 16 and the respective switching elements SW1, SW2.

The actuator substrate 34 on which the actuator section 74 for each of the switching elements SW1, SW2 is formed is provided with a hollow space 100 at a position corresponding to the operating section 90 in the same manner as in the first element 16 described above. The hollow space 100 is communicated with the outside via a through-hole 102 having a small diameter provided through another surface of the actuator substrate 34.

The actuator substrate 34 has a thin-walled portion where the hollow space 100 is formed, and the other portion is thick-walled. The thin-walled portion tends to undergo the vibration with respect to the external force and functions as a vibrating section 104. The portion other than the hollow space 100 is thick-walled and functions as a fixed section 106 for supporting the vibrating section 104.

Figure 13:
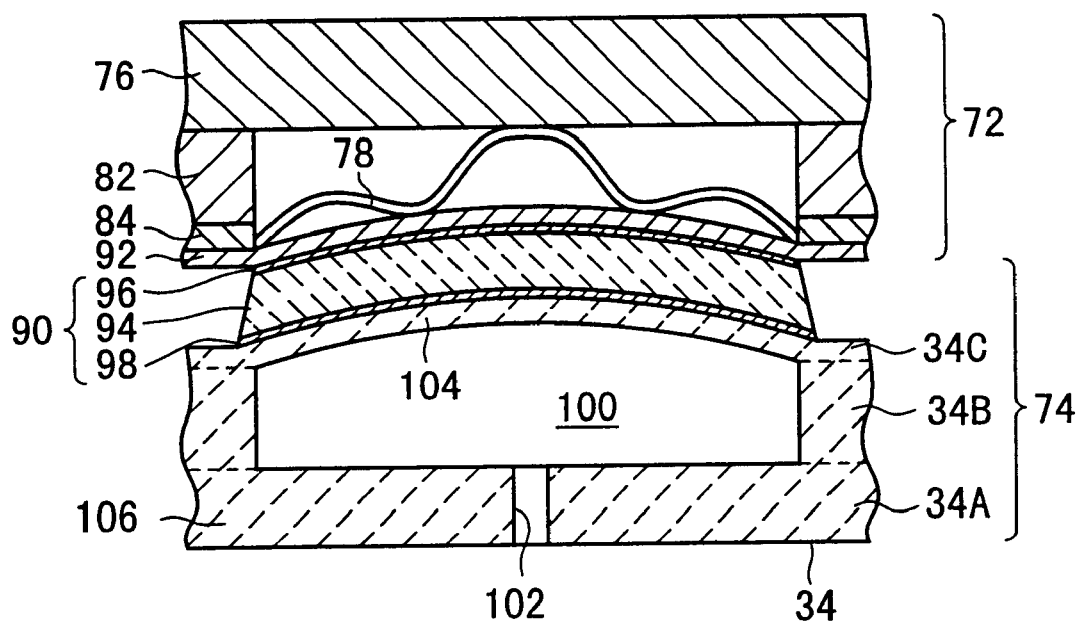
FIG. 13 shows a configuration illustrating the ON state for the first and second switching elements.

When a predetermined voltage is applied between the upper electrode 96 and the lower electrode 98, the actuator section 74 bends so that the actuator section 74 is convex toward the terminal plate 76, for example, as shown in FIG. 13.

The operation of the piezoelectric relay 70 will now be explained. It is supposed that the shape-retaining layer 94 is made of an anti-ferroelectric member. At first, when the voltage is applied to the shape-retaining layer 94 between the upper electrode 96 and the lower electrode 98, the electric field-induced strain is generated in the shape-retaining layer 94. The shape-retaining layer 94 makes bending displacement by the lateral effect of the electric field-induced strain such that the shape-retaining layer 94 is convex toward the terminal plate 76. FIG. 13 shows the displacement state. When the shape-retaining layer 94 bends such that the shape-retaining layer 94 is convex toward the terminal plate 76, the plate spring 78 is pressed and lifted upwardly. The plate spring 78 contacts with the terminal plate 76, and thus the ON operation is effected. When the reference voltage Vb (for example, 0 V) is applied between the upper electrode 96 and the lower electrode 98, the actuator section 74 is restored to the neutral state.

When a diameter of one shape-retaining layer 94 is about 100 μm, for example, the contact area S between the plate spring 78 and the terminal plate 76 is relatively small. However, when a large number of, for example, ten piezoelectric relays 70 are used as a set for the contact portion to constitute the switching elements SW1, SW2, it is possible to flow a large current therethrough. Further, each of the piezoelectric relays 70 can use the actuator section 74 which is compact and has high rigidity. Therefore, it is possible to obtain a high speed switching element capable of performing ON/OFF operation with a large current, while ensuring the high integration and realizing the high frequency of the switching operation.

When the shape-retaining layer 94 of the operating section 90 is made of an electrostrictive layer or an anti-ferroelectric layer other than the piezoelectric film, any polarity of the applied voltage will do. When the anti-ferroelectric member is once displaced, it maintains its displacement even when the applied voltage is made to be 0 V. Therefore, it is also possible to stop the application of the voltage after displacement.

When the switching element SW1, SW2 is constituted by the piezoelectric relay 70 which can be miniaturized and perform the high speed operation as described above, it is easy to realize, for example, the high speed switching operation of 1 μs and the low ON resistance. When one switching element SW1 or SW2 is constituted by a plurality of piezoelectric relays 70, it is possible to realize, for example, ON resistance of 0.1Ω. It is possible to contribute to the realization of the DC to DC converter 10 having a high output current and a high output voltage, without using any expensive elements such as a coil and a transformer. Further, in this case, even when some of the piezoelectric relays 70 are disordered, the switching operation can be continued with the other piezoelectric relays 70. Thus, it is possible to improve the reliability.

Next, explanation will be made for preferred construction, materials, etc. for the constitutive members of the first element 16 and the constitutive members of the first and second switching elements SW1, SW2.

At first, it is especially preferable for the actuator substrate 34 to use a material containing a major component of zirconium oxide, a material containing a major component of aluminum oxide, or a material containing a major component of a mixture of them.

The spacer layer 34B of the actuator substrate 34 can be formed in accordance with a technique such as a screen printing method. The entire actuator substrate 34 may be formed by means of integrated co-firing, joining and integrating the respective layers 34A to 34C with glass or resin, or additional attaching. The actuator substrate 34 may have a structure having four or more layers.

The shape-retaining layer 94 can be made of a piezoelectric/electrostrictive layer, an anti-ferroelectric layer, or a mixture of them. When the piezoelectric/electrostrictive layer is used, it is possible to use, for example, a material containing a major component of lead zirconate (PMN system), a material containing a major component of lead nickel niobate (PNN system), a material containing a major component of lead zinc niobate, a material containing a major component of lead manganese niobate, a material containing a major component of lead magnesium tantalate, a material containing a major component of lead nickel tantalate, a material containing a major component of lead antimony stannate, a material containing a major component of lead titanate, a material containing a major component of lead magnesium tungstate, a material containing a major component of lead cobalt niobate, or a composite material containing any combination of them. However, among the ceramic materials described above, the ceramic material containing lead zirconate is most frequently used for the constitutive material for the piezoelectric/electrostrictive layer.

When the anti-ferroelectric layer is used, it is preferable to use a compound containing a major component of lead zirconate, a compound containing a major component of lead zirconate and lead stannate, a compound obtained by adding lanthanum oxide to lead zirconate, and a compound obtained by adding lead zirconate and lead niobate to a component including lead zirconate and lead stannate. Especially, when the driving operation is performed at a low voltage, it is preferable to apply an anti-ferroelectric layer containing a component including lead zirconate and lead stannate.

When the shape-retaining layer 94 is formed, the material as described above is formed into paste or slurry. A variety of thick film formation techniques are preferably adopted, based on, the screen printing, the spray, the coating, the dipping, the application, and the electrophoresis method, etc. Especially, the screen printing method is preferably used since a fine printing pattern can be formed inexpensively.

Each of the pairs of electrodes 48a, 48b and electrodes 96, 98 may be a conductor which is endurable to the oxidizing atmosphere at a high temperature. The conductor may be, for example, a metal simple substance or an alloy. However, it is preferable to use those containing a major component of a high melting point noble metal such as platinum, palladium, and rhodium, or an alloy such as silver-palladium, silver-platinum, and platinum-palladium, or a cermet material including, for example, platinum and ceramic material or piezoelectric/electrostrictive material.

Each of the pair of electrodes 48a, 48b and 96, 98 may be formed by using the electrode material in accordance with the various thick film formation techniques described above or an ordinary film formation technique based on the thin film formation method including, for example, the sputtering, the ion beam, the vacuum deposition, the ion plating, CVD, the plating, etc. However, it is preferable for the lower electrodes 48b, 98 to use, the screen printing, the spray, the dipping, the application, and the electrophoresis method, etc. The thin film formation technique described above is also preferably adopted for the upper electrodes 48a, 96 in addition to the thick film formation technique in the same manner as described above.

The pair of electrodes 96, 98 of the switching element SW1, SW2 are preferably formed as a pair of upper and lower ones of the shape-retaining layer 94 from a structural viewpoint. However, the pair of electrodes 96, 98 may be provided, for example, in a comb-shaped configuration on only the upper surface or the lower surface of the shape-retaining layer 94.

Next, explanation will be made for several modified embodiments of the DC to DC converter 10 according to the first embodiment with reference to FIGS. 14 to 24. In FIGS. 15 to 18, the control unit 22 is omitted from the illustration.

Figure 14:
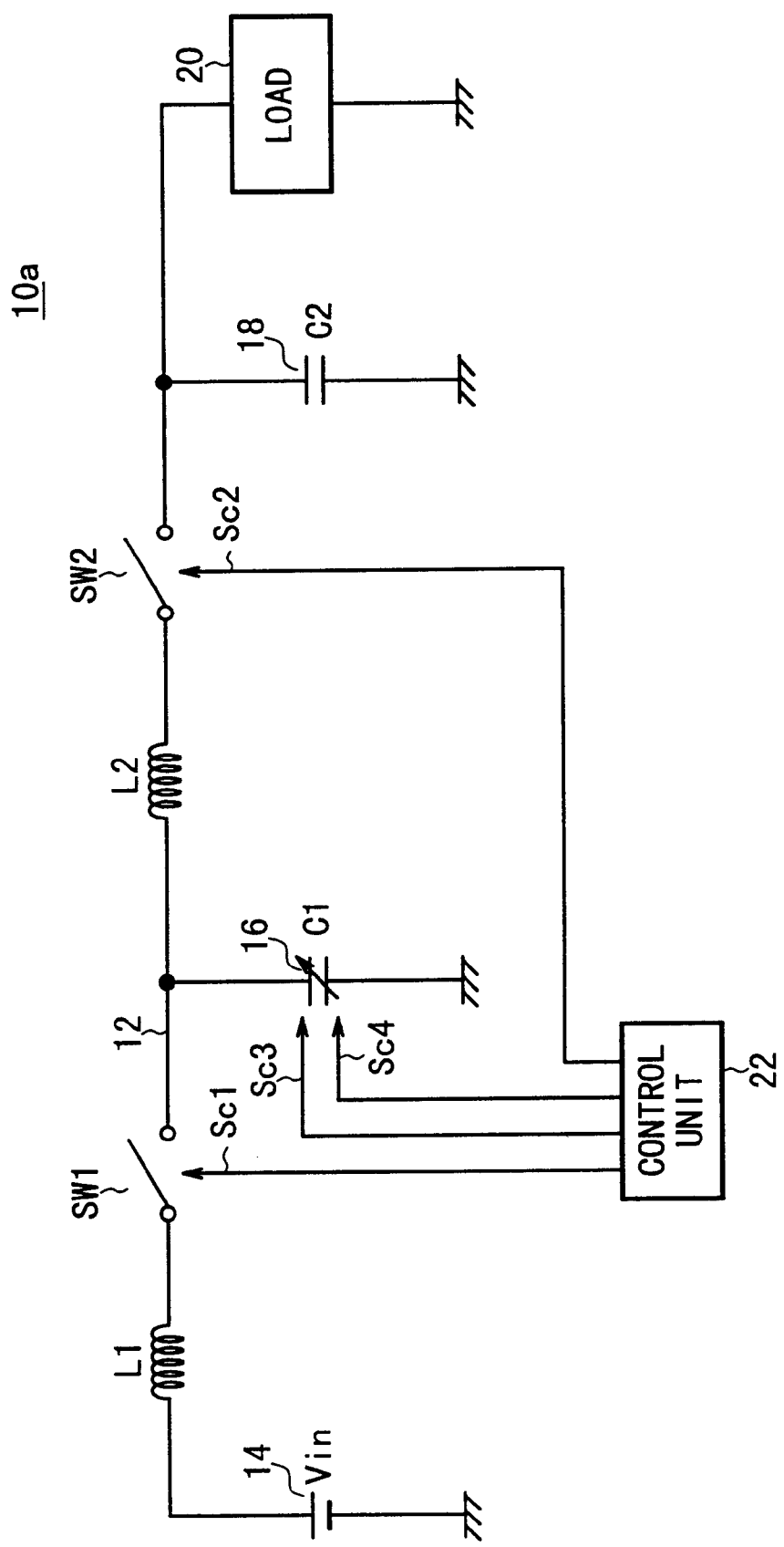
FIG. 14 is a circuit diagram illustrating a configuration of a DC to DC converter according to a first modified embodiment.

At first, as shown in FIG. 14, a DC to DC converter 10a according to the first modified embodiment is constructed in approximately the same manner as the DC to DC converter 10 according to the embodiment of the present invention. However, the former is different from the latter in that a first inductor L1 is connected in series to the first switching element SW1, and a second inductor L2 is connected in series to the second switching element SW2.

Figure 5:
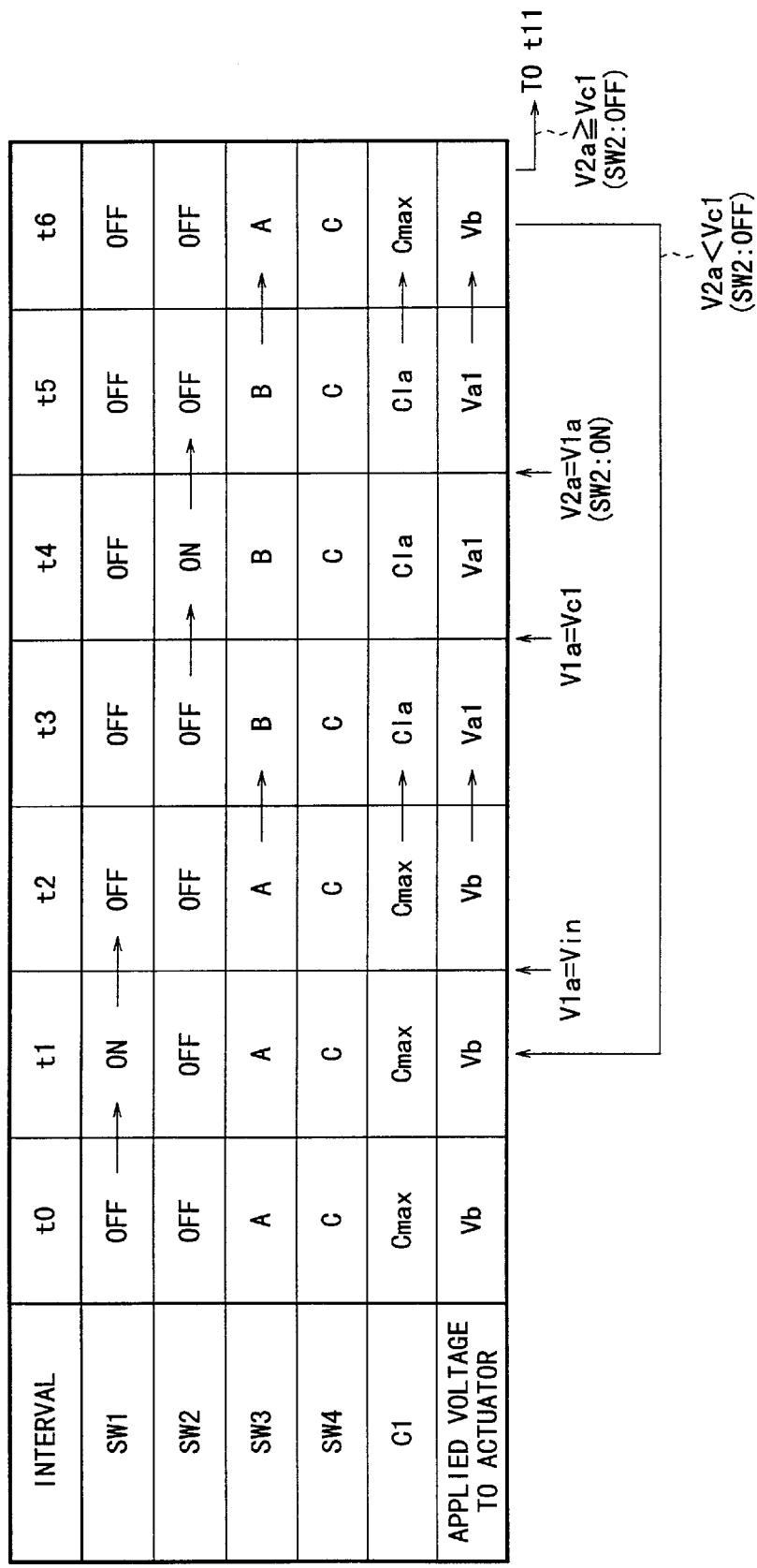
FIG. 5 is a sequence table (No. 1) illustrating the operation of the DC to DC converter according to the embodiment of the present invention.

The DC to DC converter 10a according to the first modified embodiment also performs the operation along with the sequence table shown in FIGS. 5 and 6. However, when the process proceeds from the interval t1 to the interval t2 (or from the interval t11 to the interval t12), the proceeding operation to the interval t2 (or the interval t12) is effected at the point of time when the terminal voltage of the first element 16 is maximum in accordance with LC resonance by the first inductor L1 and the first element 16.

Similarly, when the process proceeds from the interval t4 to the interval t5 (or from the interval t14 to the interval t15), the proceeding operation to the interval t5 (or interval t15) is effected at the point of time when the terminal voltage of the second element 18 is maximum in accordance with LC resonance by the second inductor L2 and the second element 18.

Figure 15:
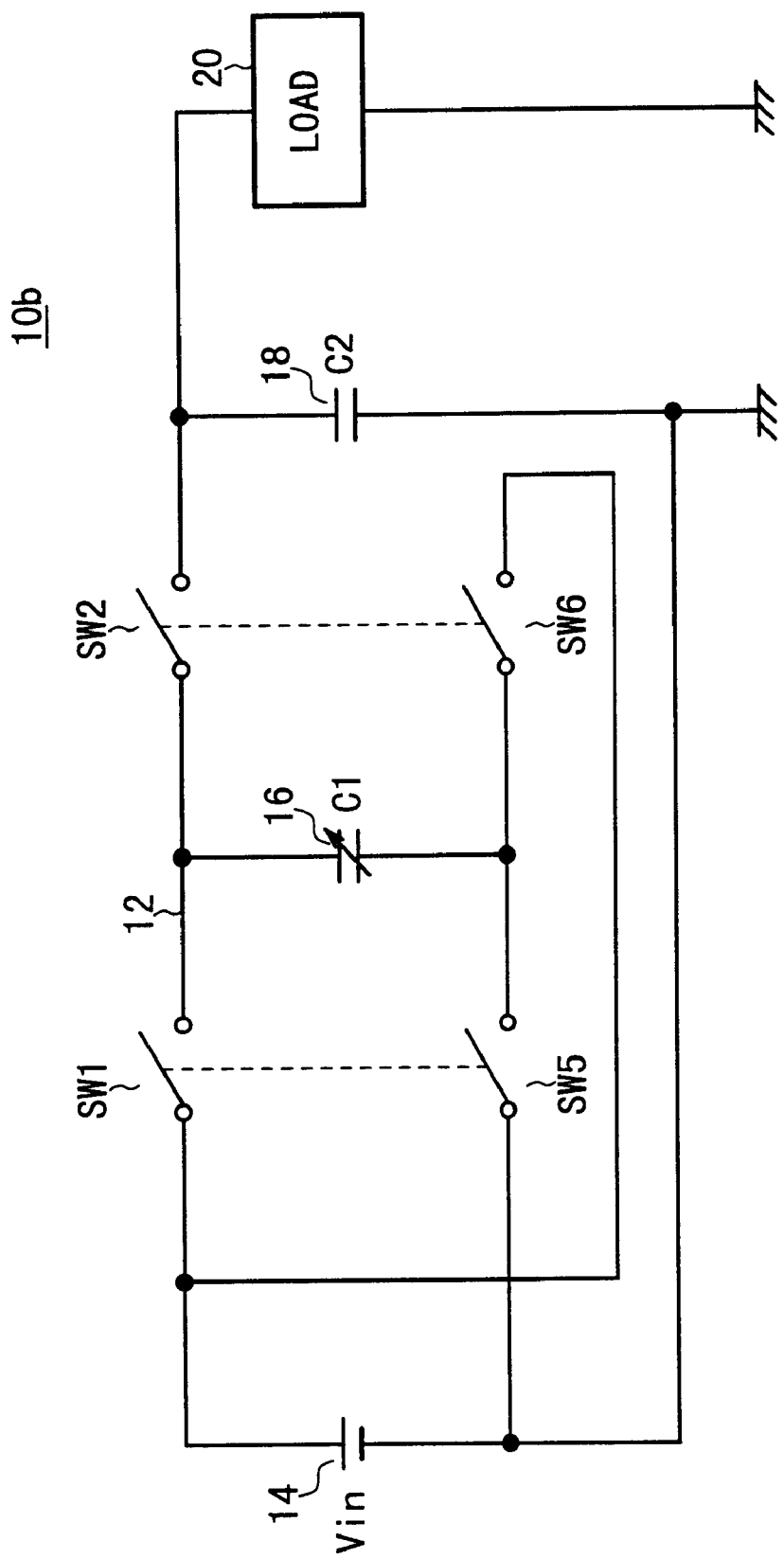
FIG. 15 is a circuit diagram illustrating a configuration of a DC to DC converter according to a second modified embodiment.

Next, as shown in FIG. 15, a DC to DC converter 10b according to the second modified embodiment is made in approximately the same manner as the DC to DC converter 10 according to the embodiment of the present invention. However, the former is different from the latter in that a fifth switching element SW5, which is cooperated with the first switching element SW1, is connected between the negative electrode of the voltage-generating source 14 and the negative electrode of the first element 16 (upper electrode 48a of the actuator section 32), and a sixth switching element SW6, which is cooperated with the second switching element SW2, is connected between the negative electrode of the first element 16 and the positive electrode of the voltage-generating source 14.

Also in the DC to DC converter 10b according to the second modified embodiment, the first switching element SW1 (and the fifth switching element SW5) and the second switching element SW2 (and the sixth switching element SW6) are alternately subjected to the ON/OFF operation (hereinafter referred to as "charge pumping operation"). Accordingly, the first element 16 and the second element 18 are alternately charged to raise the voltage Vin supplied from the voltage-generating source 14.

Especially, in the DC to DC converter 10b according to the second modified embodiment, the terminal voltage of the second element 18 can be raised to be about twice the voltage Vin from the voltage-generating source 14 in accordance with the charge pumping operation as described above, even when the capacitance of the capacitance-forming component 30 of the first element 16 is not varied, for example, even in a state that the distance between the electrode section 52 and the upper electrode 48a is shortest.

Figure 16:
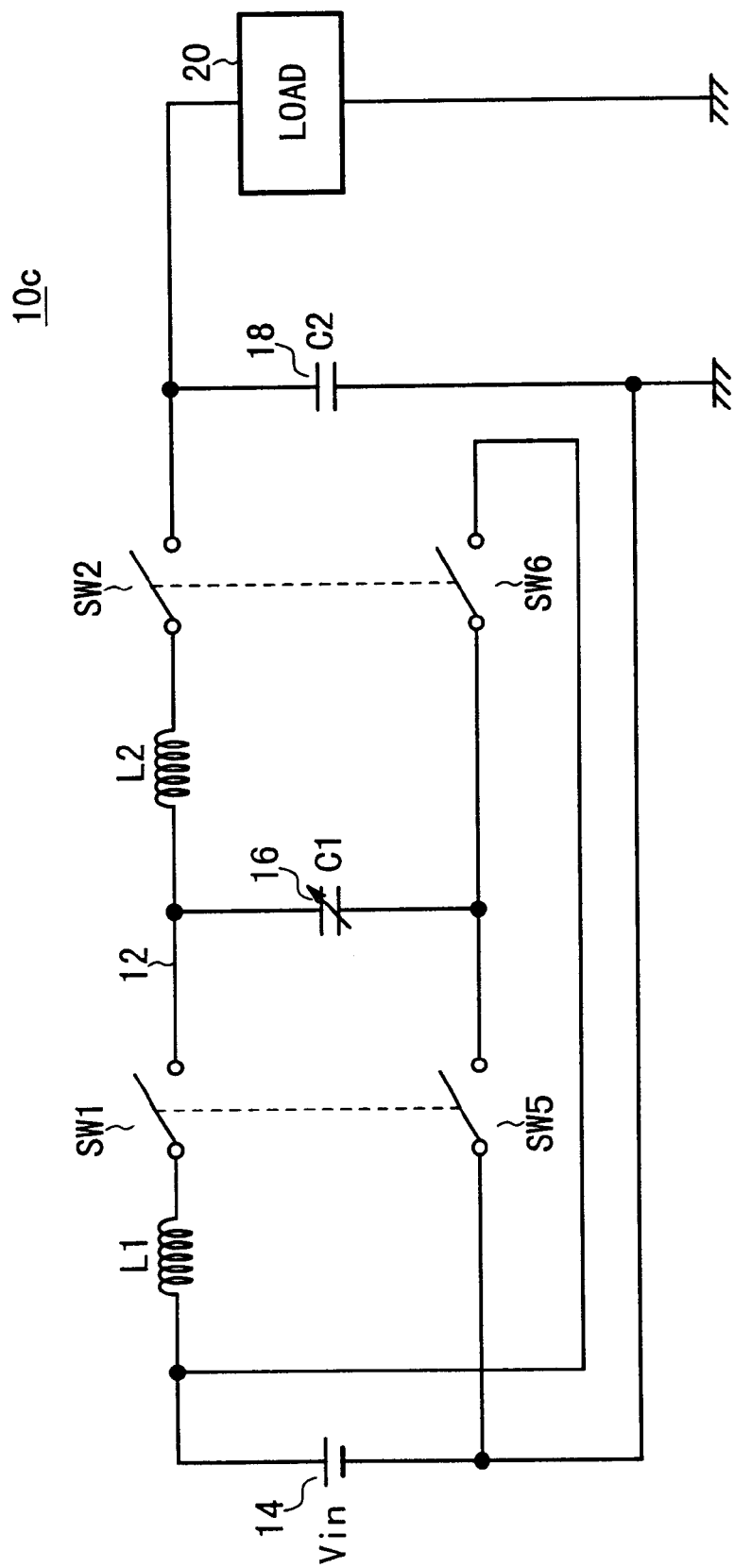
FIG. 16 is a circuit diagram illustrating a configuration of a DC to DC converter according to a third modified embodiment.

Next, as shown in FIG. 16, a DC to DC converter 10c according to the third modified embodiment is made in approximately the same manner as the DC to DC converter 10b according to the second modified embodiment. However, the former is different from the latter in that a first inductor L1 is connected in series to the first switching element SW1, and a second inductor L2 is connected in series to the second switching element SW2.

In the same manner as in the DC to DC converter 10a according to the first modified embodiment, the switching timing from the ON operation to the OFF operation for the first switching element SW1 is effected based on LC resonance by the first inductor L1 and the first element 16, and the switching timing from the ON operation to the OFF operation for the second switching element SW2 is effected based on LC resonance by the second inductor L2 and the second element 18.

Figure 17:
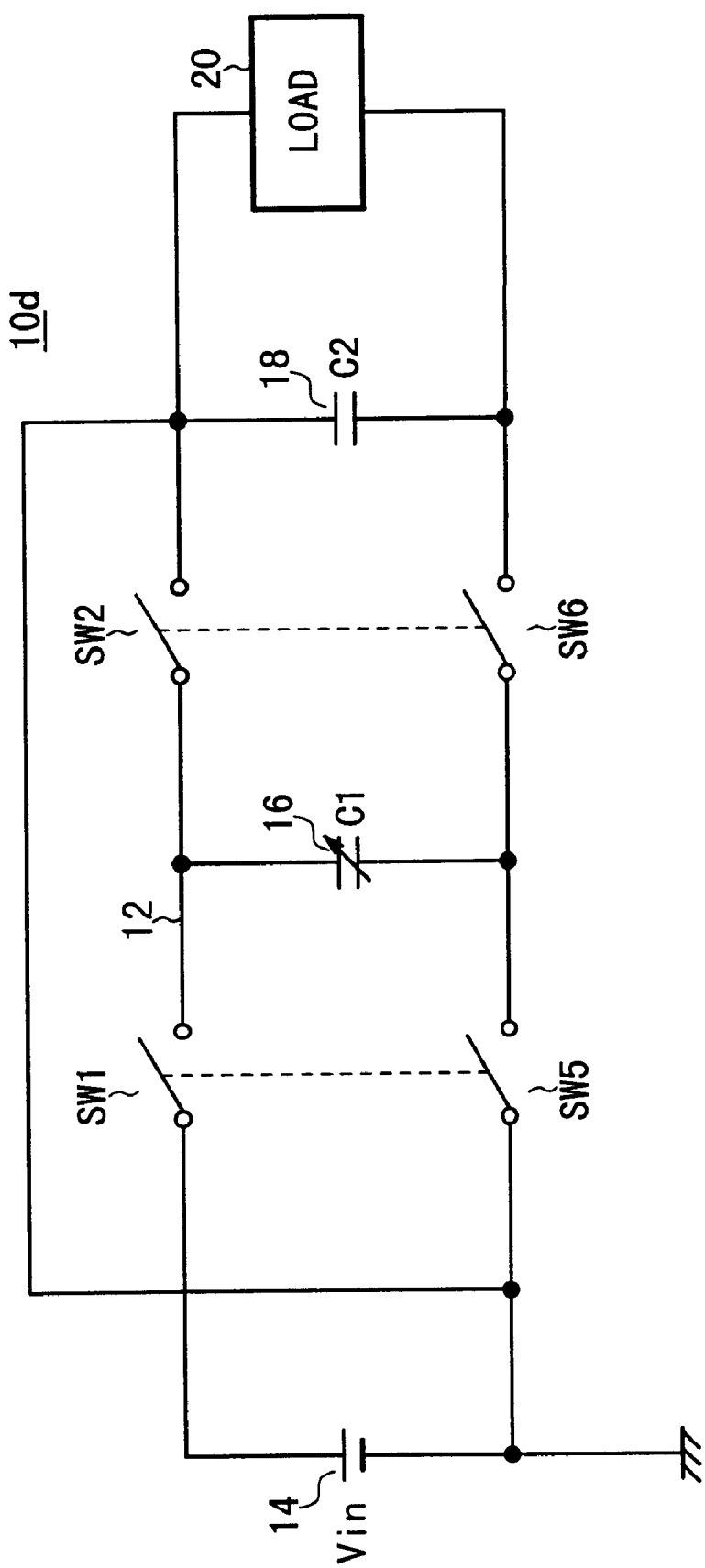
FIG. 17 is a circuit diagram illustrating a configuration of a DC to DC converter according to a fourth modified embodiment.

Next, as shown in FIG. 17, a DC to DC converter 10d according to the fourth modified embodiment is made in approximately the same manner as the DC to DC converter 10b according to the second modified embodiment. However, the former is different from the latter in that the positive electrode of the second element 18 is grounded, and the negative voltage is retained by the second element 18. When the DC to DC converter 10d is used, the negative high voltage can be generated from the positive voltage. Therefore, it is possible to widen the application of the DC to DC converter 10d.

Figure 18:
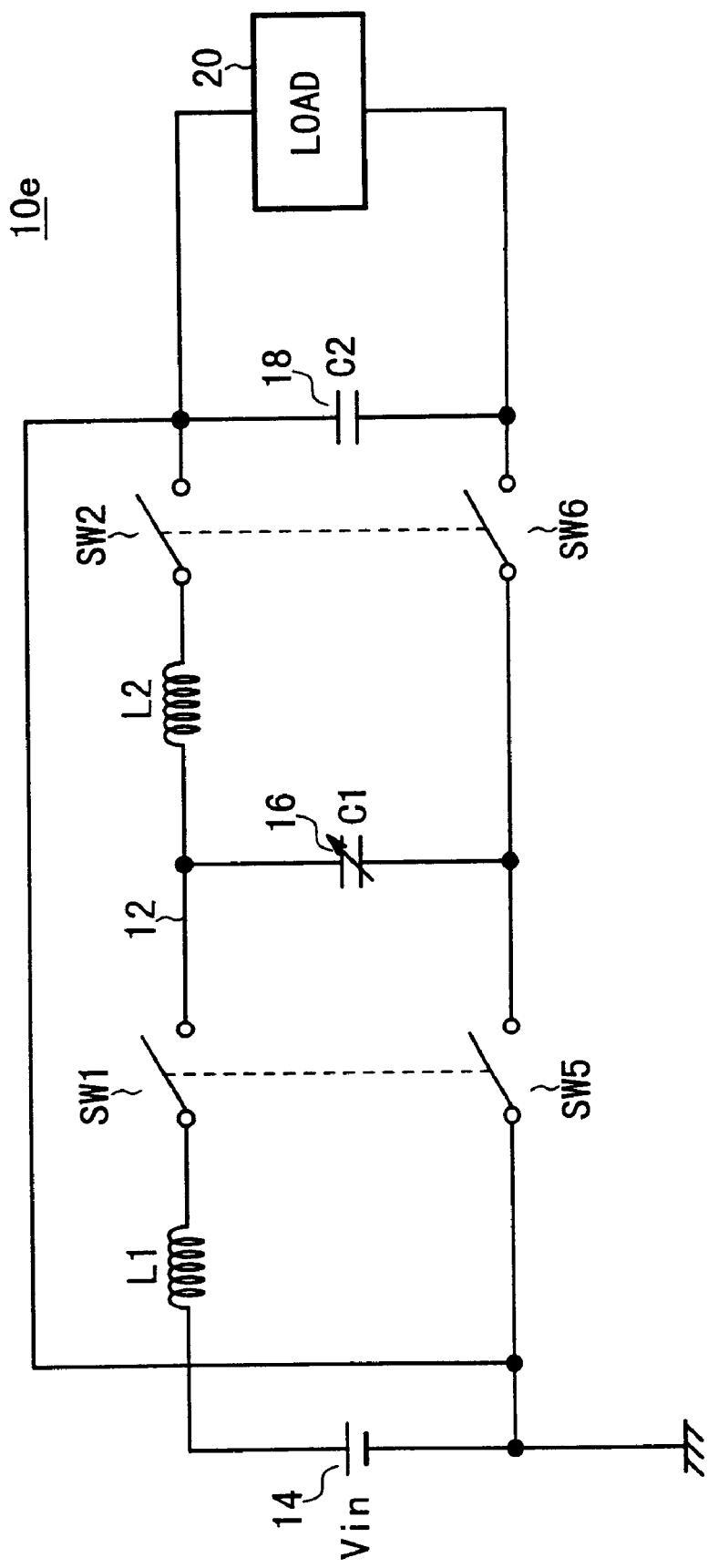
FIG. 18 is a circuit diagram illustrating a configuration of a DC to DC converter according to a fifth modified embodiment.

Next, as shown in FIG. 18, a DC to DC converter 10e according to the fifth modified embodiment is constructed in approximately the same manner as the DC to DC converter 10d according to the fourth modified embodiment. However, the former is different from the latter in that a first inductor L1 is connected in series to the first switching element SW1, and a second inductor L2 is connected in series to the second switching element SW2.

Also in this case, in the same manner as in the DC to DC converter 10a according to the first modified embodiment, the switching timing from the ON operation to the OFF operation for the first switching element SW1 is effected based on LC resonance by the first inductor L1 and the first element 16, and the switching timing from the ON operation to the OFF operation for the second switching element SW2 is effected based on LC resonance by the second inductor L2 and the second element 18.

Figure 19:
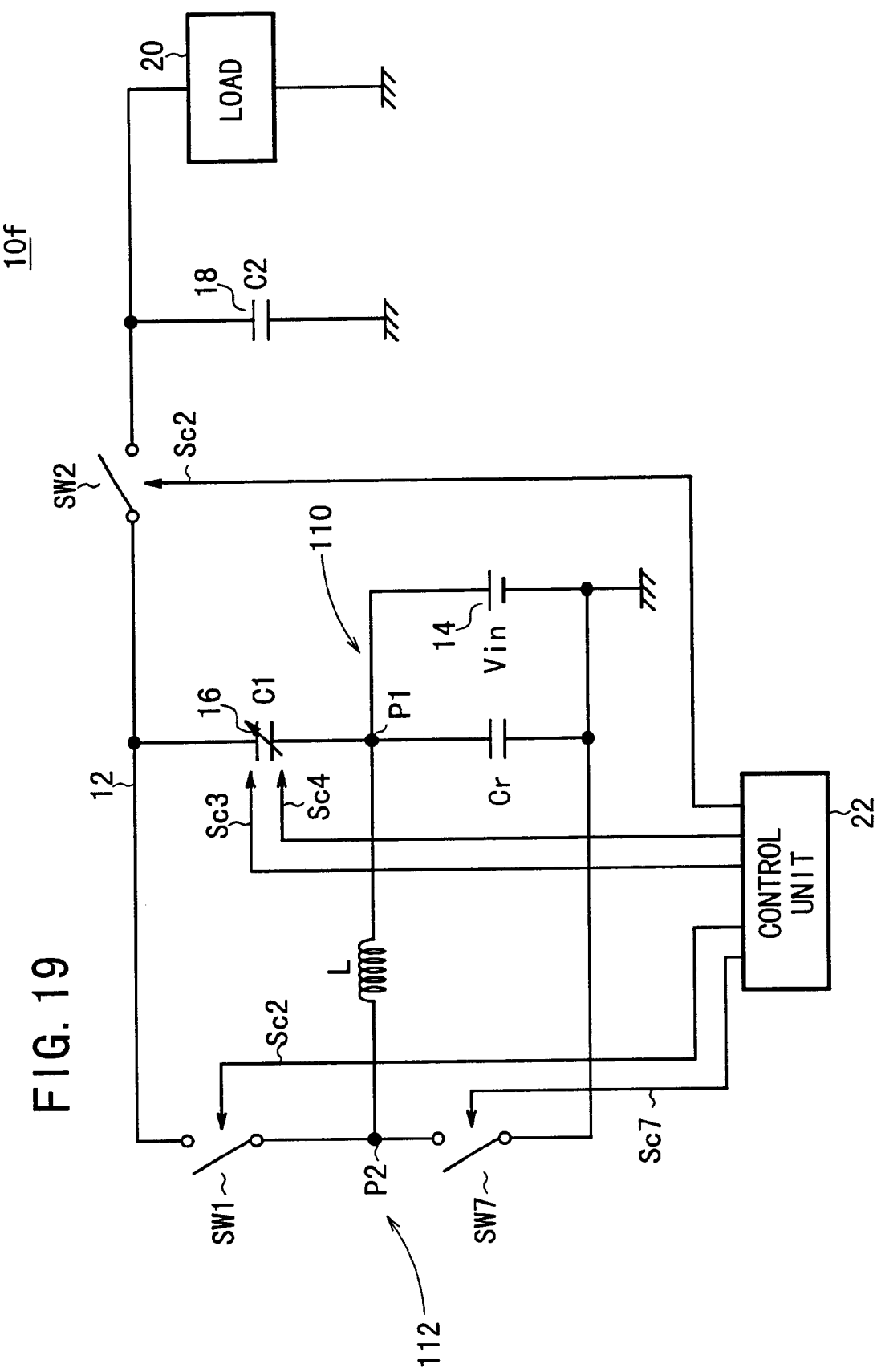
FIG. 19 is a circuit diagram illustrating a configuration of a DC to DC converter according to a sixth modified embodiment.
Figure 20:
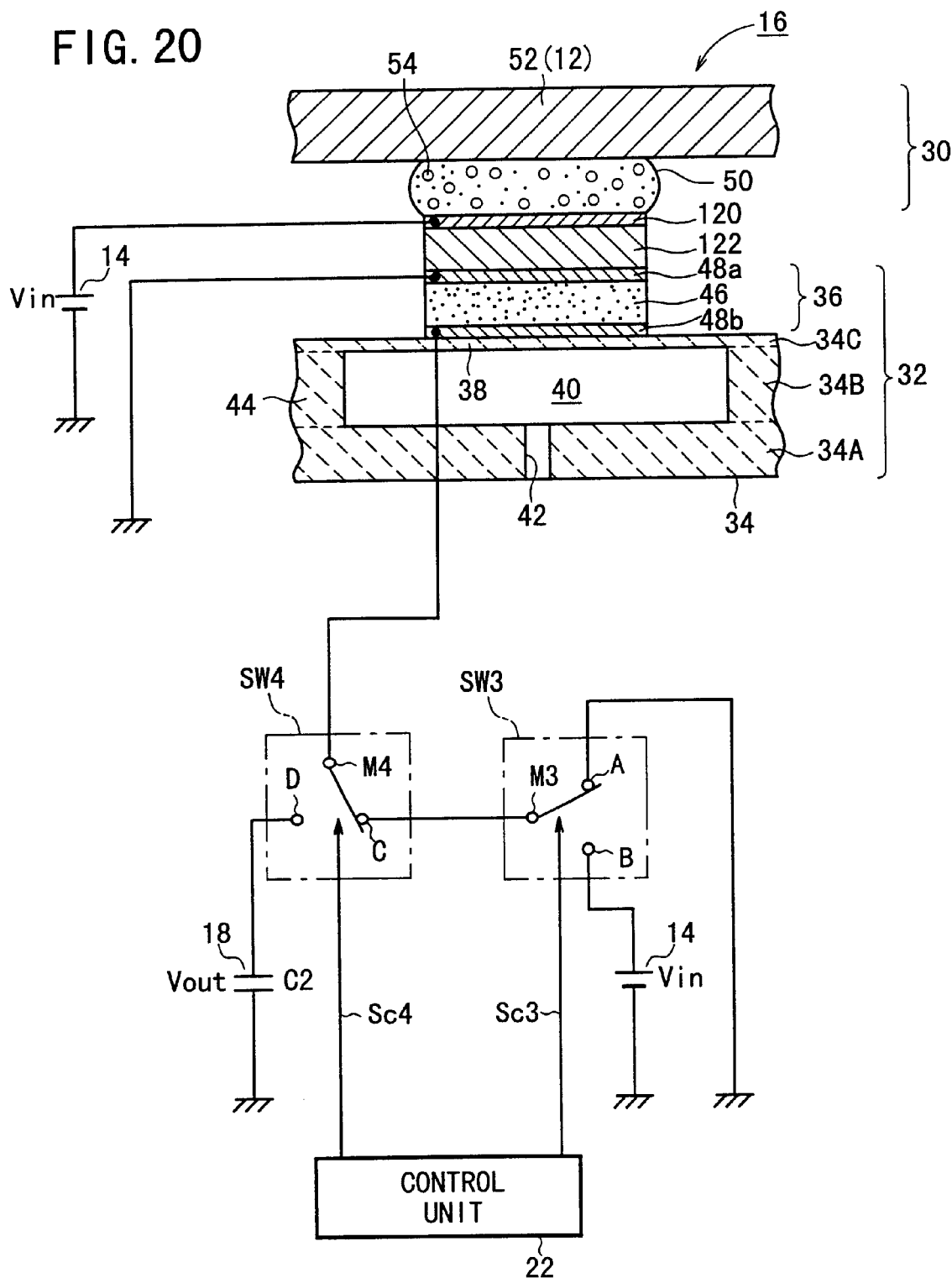
FIG. 20 shows a configuration illustrating a case that an actuator section is in the neutral state in a first element of the DC to DC converter according to the sixth modified embodiment.

Next, as shown in FIG. 19, a DC to DC converter 10f according to the sixth modified embodiment comprises a first element 16, a second element 18, a reservoir capacitor Cr, an inductor L, and a plurality of switching elements SW1 to SW4, SW7 (see FIG. 20 for the switching elements SW3, SW4).

Specifically, a first series circuit 110 including the first element 16 and the reservoir capacitor Cr connected in series, and a second series circuit 112 including the first and seventh switching elements SW1, SW7 connected in series are connected in parallel to one another.

Further, the DC to DC converter 10f is constructed as follows. That is, a connection point p1 of the first element 16 and the reservoir capacitor Cr in the first series circuit 110 is connected via the inductor L to a connection point p2 of the first and seventh switching elements SW1, SW7 in the second series circuit 112. The second element 18 is connected in parallel to the first series circuit 110. A load 20 is connected in parallel to the second element 18. The second switching element SW2 is connected between the first element 16 and the second element 18. A voltage-generating source 14 is connected in parallel to the reservoir capacitor Cr.

As shown in FIG. 20, the first element 16 is made in approximately the same manner as the first element 16 of the DC to DC converter 10 according to the embodiment of the present invention. However, the former is different from the latter in that a capacitance-forming component 30 comprises a pair of electrode sections (first electrode section 52 and second electrode section 120), and a dielectric member 50 interposed between the pair of electrode sections 52, 120, and an insulating layer 122 intervenes between the second electrode section 120 and the upper electrode 48a of the actuator section 32. The positive electrode electric potential Vin of the voltage-generating source 14 is applied to the second electrode section 120, and the ground electric potential Vss is applied to the upper electrode 48a of the actuator section 32.

Figure 21:
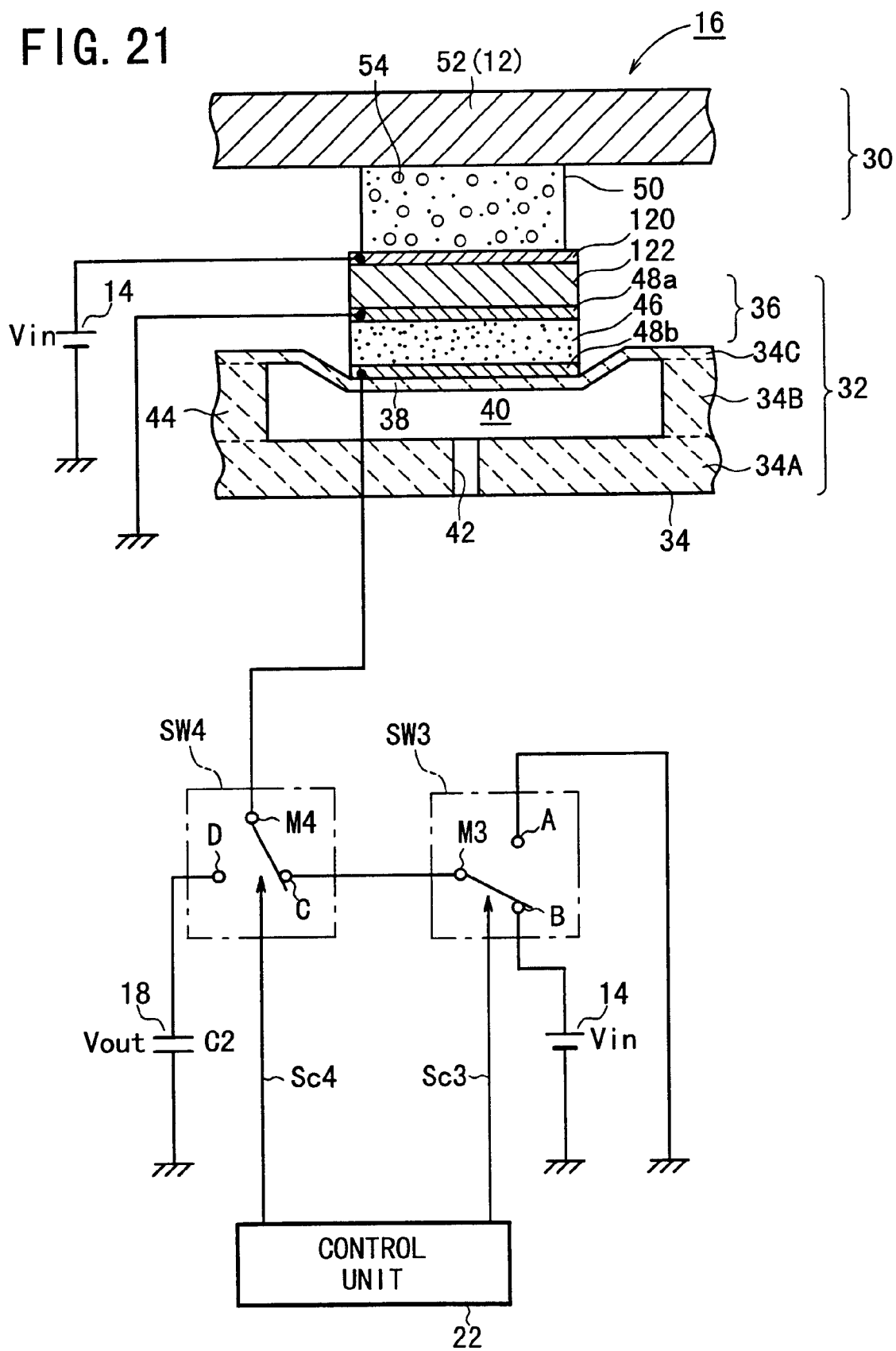
FIG. 21 shows a configuration illustrating a case that a first voltage is applied to the actuator section in the first element of the DC to DC converter according to the sixth modified embodiment.
Figure 22:
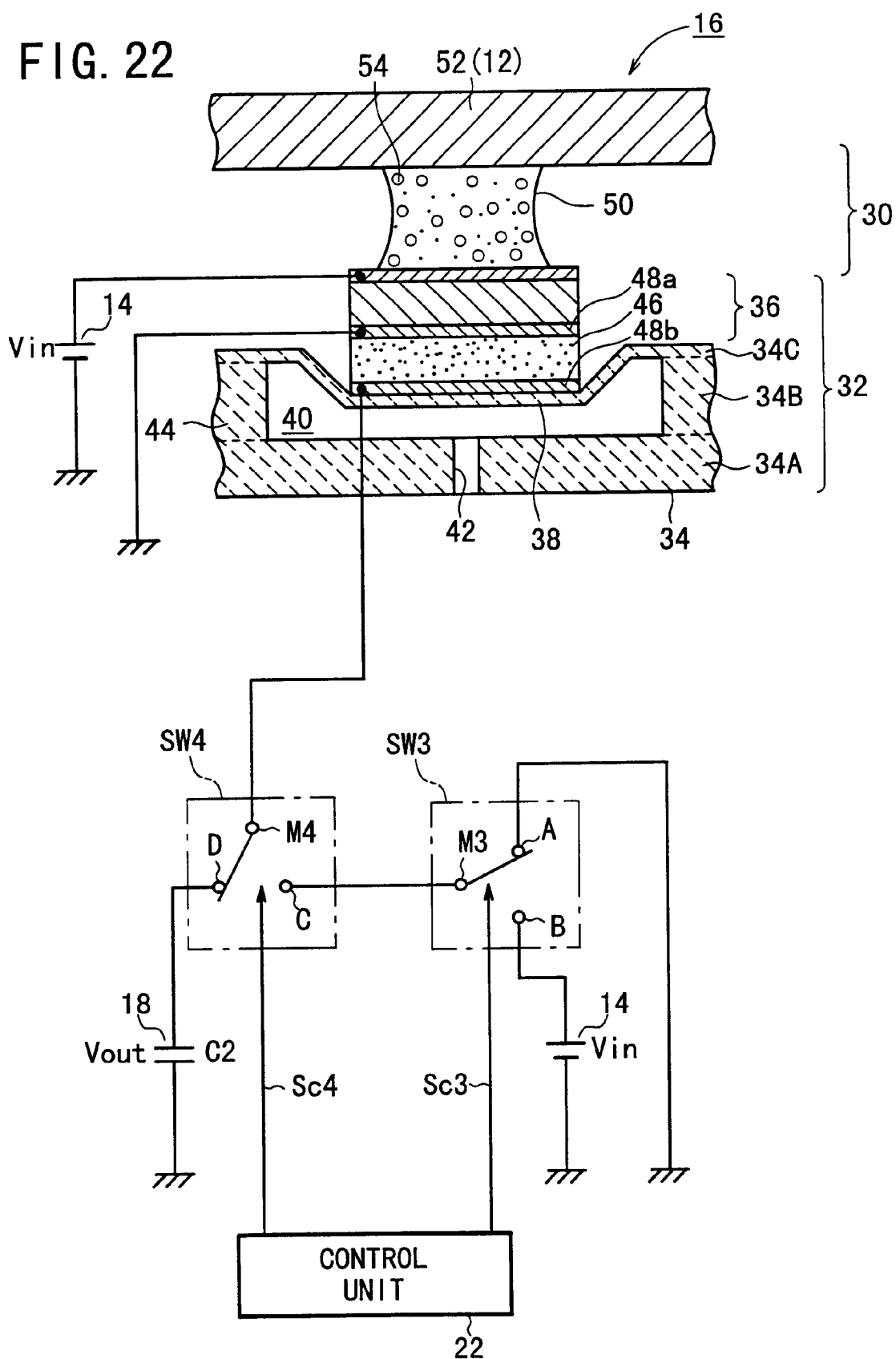
FIG. 22 shows a configuration illustrating a case that a second voltage is applied to the actuator section in the first element of the DC to DC converter according to the sixth modified embodiment.
Figure 23:
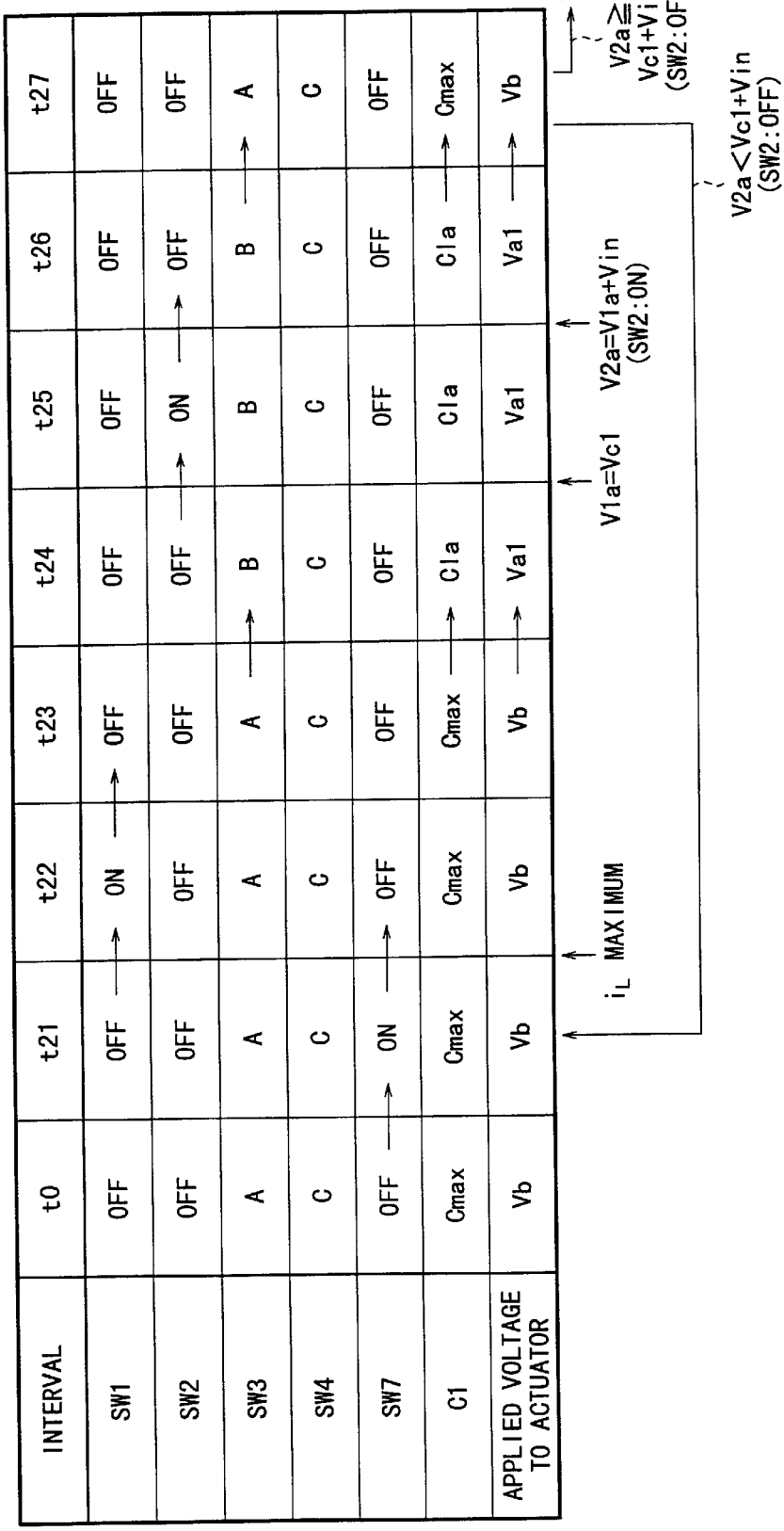
FIG. 23 is a sequence table (No. 1) illustrating the operation of the DC to DC converter according to the sixth modified embodiment.
Figure 25:
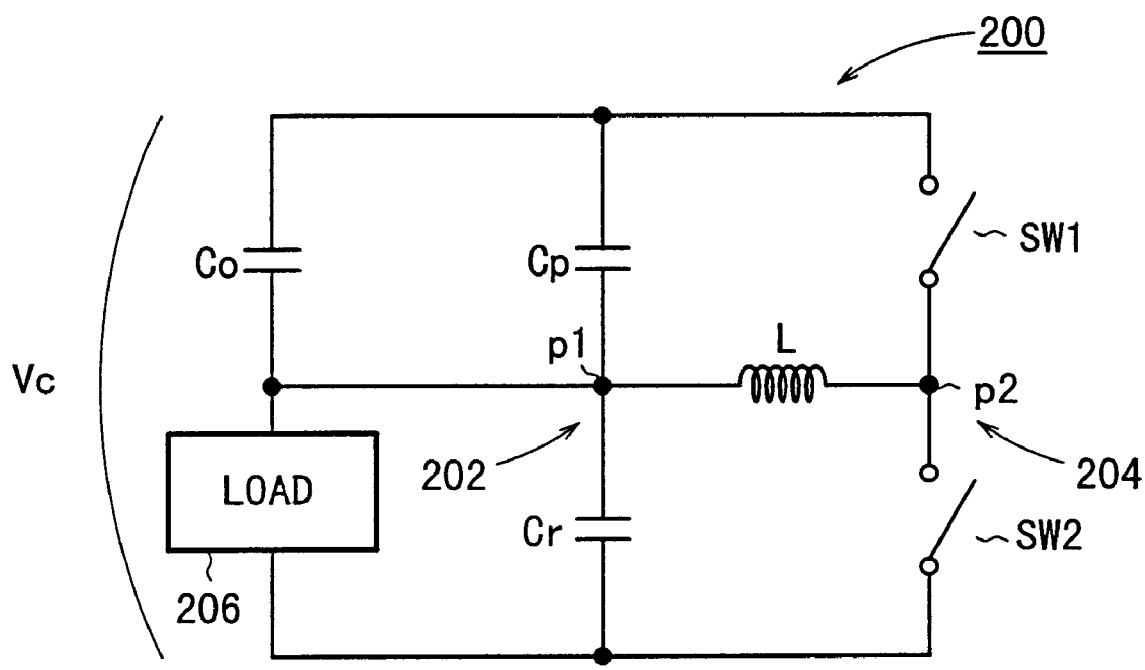
FIG. 25 is a circuit diagram illustrating a configuration of a DC to DC converter of the charge pump type concerning a conventional technique.
Figure 26:
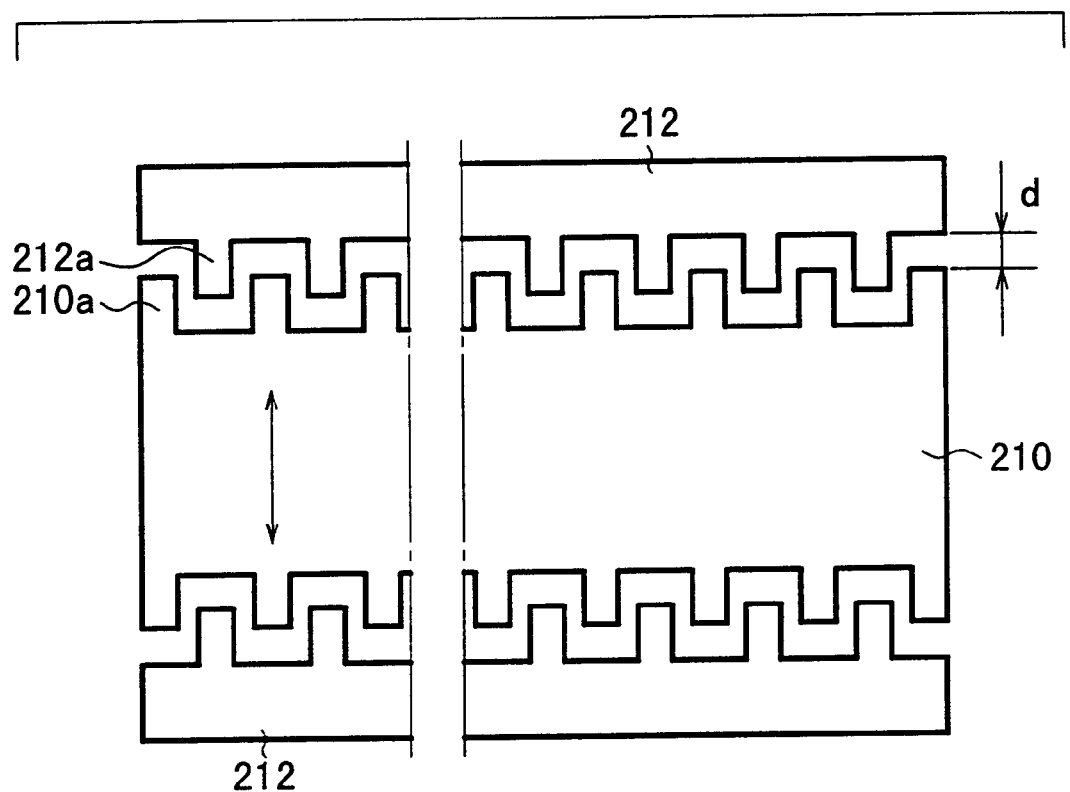
FIG. 26 shows a configuration illustrating a pump capacitor concerning a conventional technique.
Figure 27:
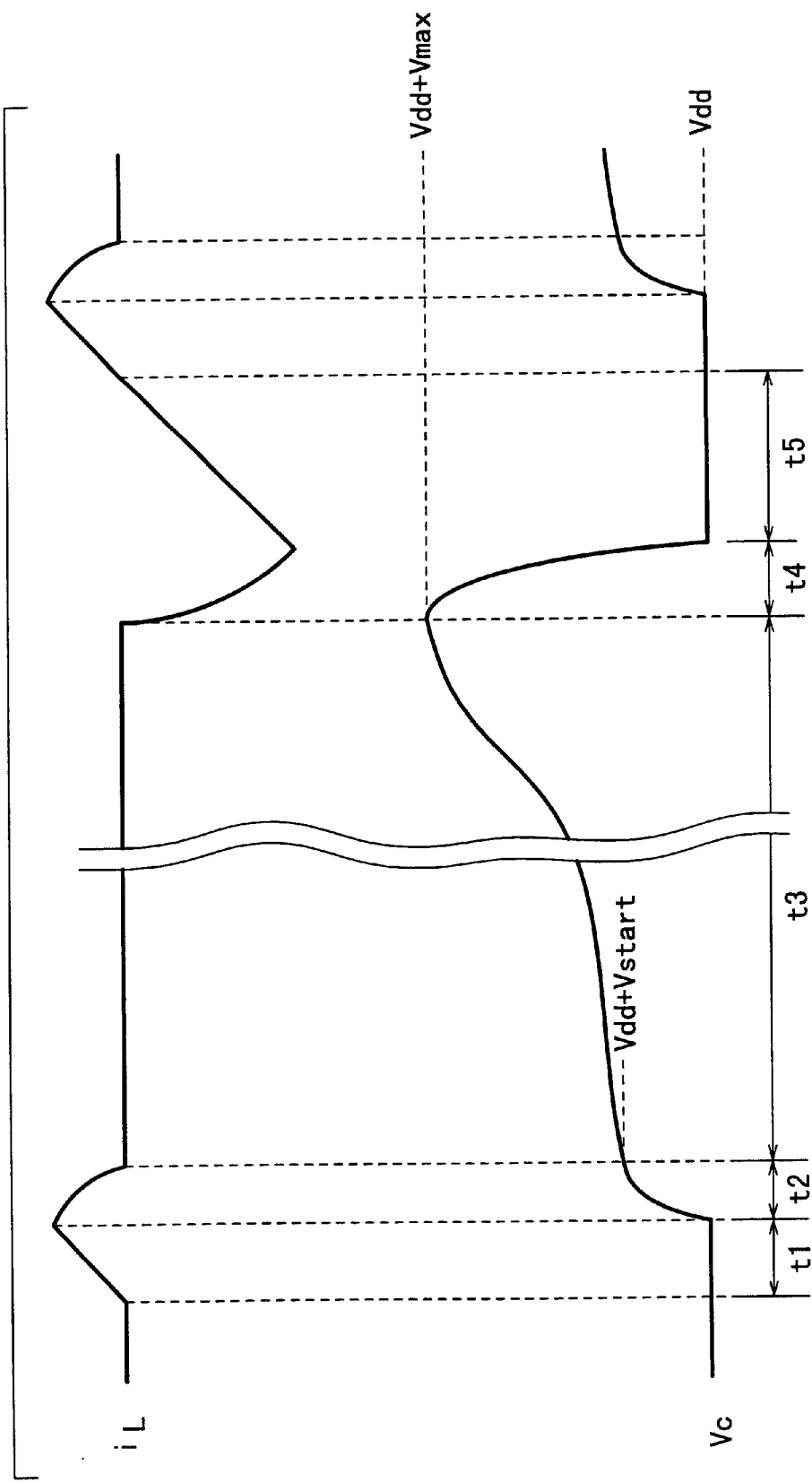
FIG. 27 is a timing chart illustrating the operation of the DC to DC converter of the charge pump type concerning the conventional technique.

Next, the operation of the DC to DC converter 10f according to the sixth modified embodiment will be explained with reference to the concept of operation in FIGS. 20 to 22 and the sequence table in FIGS. 23 and 24.

At first, in the initial state (an interval t0 in FIG. 23), the control unit 22 makes all of the first to fourth control signals Sc1 to Sc4 and the seventh control signal Sc7 the low level. Therefore, all of the first and second switching elements SW1, SW2 and the seventh switching element SW7 are in the OFF state. Further, the third switching element SW3 is selected by the fourth switching element SW4, and the ground electric potential Vss is selected by the third switching element SW3. Accordingly, as shown in FIG. 20, the reference voltage Vb is applied to the actuator section 32, and the actuator section 32 maintains the neutral state. The capacitance C1 of the first element 16 is the maximum value Cmax.

In this state, the control unit 22 makes at the start of an interval t21 the seventh control signal Sc7 the high level, and makes the seventh switching element SW7 the ON state. Accordingly, in the interval t21, the ramp current (inductor current $i_L$) flows from the reservoir capacitor Cr to the inductor L. At the point of time (the start of an interval t22) when the value of the current flowing through the inductor L is maximum, the control unit 22 makes the first control signal Sc1 the high level, and makes the seventh control signal Sc7 the low level. Accordingly, in the interval t22, the inductor current $i_L$ is supplied to the first element 16 in accordance with the energy of the inductor L, and the electric charge is stored in the first element 16. In accordance with the storage of the electric charge, the terminal voltage V1a of the first element becomes the voltage $V_{START}$ obtained when the capacitance C1 of the first element 16 is the maximum value Cmax.

After that, at the start of an interval t23, the control unit 22 makes the first control signal Sc1 the low level, and makes the first switching element SW1 the OFF state. Accordingly, the current does not flow from the first element 16 to the other elements (for example, the voltage-generating source 14 and the second element 18). Since the current is stopped in the interval t23, the terminal voltage V1a of the first element 16 is retained to be $V_{START}$.

At the point of time (the start of an interval t24) when a predetermined period of time elapses from the start of the interval t23, the control unit 22 makes the third control signal Sc3 the high level, and selects the electric potential Vin of the voltage-generating source 14 by the third switching element SW3. As a result of the selection, the first voltage Va1 is applied to the actuator section 32. As shown in FIG. 21, the actuator section 32 is displaced and becomes convex toward the hollow space 40. The displacement of the actuator section 32 is transmitted via the insulating layer 122 to the capacitance-forming component 30. The distance between the pair of electrode sections 52, 120 is increased by a distance corresponding to the first voltage Va1. The contact area of the dielectric member 50 with the first electrode section 52 is reduced in an amount corresponding to the first voltage Va1. As a result, the capacitance C1 of the first element 16 is decreased (C1=C1a), and the terminal voltage V1a of the first element 16 is increased corresponding thereto (V1a =Q/C1a>$V_{START}$)

At the point of time (the start of an interval t25) when the terminal voltage V1a of the first element 16 is the first prescribed voltage Vc1, the control unit 22 makes the second control signal Sc2 the high level, and makes the second switching element SW2 the ON state. Accordingly, in the interval t25, the current flows from the first element 16 to the second element 18. The electric charge is stored in the second element 18. In the interval t25, the terminal voltage V2a of the second element 18 becomes the voltage (V1a+Vin) obtained by adding the voltage Vin to the first terminal voltage V1a. The voltage (V1a+Vin) is applied to the load 20.

At the point of time (the start of an interval t26) when the second control signal Sc2 is at the high level, and the terminal voltage V2a of the second element 18 is approximately the same as the voltage obtained by adding the voltage Vin to the terminal voltage V1a of the first element 16 at present, the control unit 22 makes the second control signal Sc2 the low level, and makes the second switching element SW2 the OFF state. In the interval t26, the second element 18 is electrically separated from the first element 16. Therefore, the second element 18 serves as a pseudo power source having the voltage corresponding to the electric charge stored in the second element 18. The electric power is supplied to the load 20.

At the point of time (the start of an interval t27) when a predetermined period of time elapses from the start of the interval t26, the control unit 22 makes the third control signal Sc3 the low level, and selects the ground electric potential Vss by the third switching element SW3. Accordingly, the reference voltage Vb is applied to the actuator section 32. Therefore, the actuator section 32 is restored to the neutral state, and the capacitance C1 of the first element 16 is the maximum value Cmax again.

Subsequently, the control unit 22 judges whether or not the second control signal Sc2 is at the low level (second switching element SW2 is in the OFF state) and the terminal voltage V2a of the second element 18 is the same as the voltage obtained by adding the voltage Vin to the first prescribed voltage Vc1.

If the terminal voltage V2a of the second element 18 is not the same as the voltage obtained by adding the voltage Vin to the first prescribed voltage Vc1, the control unit 22 repeats the processes for interval t21 and the followings. As a result of the repeated processes, the electric charge is successively stored in the second element 18. The terminal voltage V2a of the second element 18 obtained when the second switching element SW2 is in the OFF state becomes the voltage obtained by adding the voltage Vin to the first prescribed voltage Vc1.

Then, the control unit 22 operates at the start of an interval t31 shown in FIG. 24 so that the seventh control signal Sc7 is at the high level, and the seventh switching element SW7 is in the ON state. Accordingly, in the interval t31, the ramp current (inductor current $i_L$) flows from the reservoir capacitor Cr to the inductor L.

At the point of time (the start of an interval t32) when the value of the current flowing through the inductor L is maximum, the control unit 22 makes the first control signal Sc1 the high level, and makes the seventh control signal Sc7 the low level. Accordingly, in the interval t32, the inductor current $i_L$ is supplied to the first element 16 in accordance with the energy of the inductor L, and the electric charge is stored in the first element 16. In accordance with the storage of the electric charge, the terminal voltage V1a of the first element 16 becomes the voltage $V_{START}$ obtained when the capacitance C1 of the first element 16 is the maximum value Cmax.

After that, at the start of an interval t33, the control unit 22 makes the first control signal Sc1 the low level, and makes the first switching element SW1 the OFF state. Accordingly, the current does not flow from the first element 16 to the other elements (for example, the voltage-generating source 14 and the second element 18). Since the current is stopped in the interval t33, the terminal voltage V1a of the first element 16 is retained to be the voltage $V_{START}$.

At the point of time (the start of an interval t34) when a predetermined period of time elapses from the start of the interval t33, the control unit 22 makes the fourth control signal Sc4 the high level, and selects the electric potential Vout of the second element 18 by the third switching element SW4. As a result of the selection, the second voltage Va2 (>Va1) is applied to the actuator section 32. As shown in FIG. 22, the actuator section 32 is displaced and becomes convex toward the hollow space 40. The distance between the pair of electrode sections 52, 120 is increased by a distance corresponding to the second voltage Va2 (the distance is longer than that obtained with the first voltage Va1). The contact area S of the dielectric member 50 with the first electrode section 52 is reduced in an amount corresponding to the second voltage Va2. As a result, the capacitance C1 of the first element 16 is decreased (C1=C1b) as compared with the case when the first voltage Va1 is applied, and the terminal voltage V1b (>V1a) of the first element 16 is further increased corresponding thereto.

At the point of time (the start of an interval t35) when the terminal voltage V1b of the first element 16 is the second prescribed voltage Vc2, the control unit 22 makes the second control signal Sc2 the high level, and makes the second switching element SW2 the ON state. Accordingly, in the interval t35, the current flows from the first element 16 to the second element 18. The electric charge is stored in the second element 18. In the interval t35, the terminal voltage V2b of the second element 18 is the same as the voltage obtained by adding the voltage Vin to the terminal voltage V1b of the first element 16. The voltage V2b is retained to be higher than the voltage obtained by adding the voltage Vin to the terminal voltage V1a of the first element 16 in the interval t25. The voltage V2b is applied to the load 20.

At the point of time (the start of an interval t36) when the second control signal Sc2 is at the high level, and the terminal voltage V2b of the second element 18 becomes approximately the same as the voltage obtained by adding the voltage Vin to the terminal voltage V1b of the first element 16 at present, the control unit 22 makes the second control signal Sc2 the low level, and makes the second switching element SW2 the OFF state. In the interval t36, the second element 18 is electrically separated from the first element 16. Therefore, the second element 18 serves as a pseudo power source having the voltage corresponding to the electric charge stored in the second element 18. The electric power is supplied to the load 20.

At the point of time (the start of an interval t37) when a predetermined period of time elapses from the interval t36, the control unit 22 makes the fourth control signal Sc4 the low level, and selects the ground electric potential Vss by the third switching element SW3. Accordingly, the reference voltage Vb is applied to the actuator section 32. Therefore, the actuator section 32 is restored to the neutral state, and the capacitance C1 of the first element 16 is the maximum value Cmax again. After that, the processes from the interval t31 to the interval t36 are repeated. As a result of the repeated processes, the electric charge is successively stored in the second element 18. The terminal voltage V2a of the second element 18 obtained when the second switching element SW2 is in the OFF state becomes the voltage obtained by adding the voltage Vin to the second prescribed voltage Vc2.

As described above, in the DC to DC converter 10f according to the sixth modified embodiment, the voltage obtained by adding the voltage raised by the first element 16 to the voltage Vin can be used as the output voltage. Further, the voltage is raised at the two stages. Therefore, it is possible to enhance the efficiency to raise the voltage.

Alternatively, as for the configuration of the first element 16 shown in FIG. 20, for example, the constant voltage Vin may be commonly applied to the second electrode section 120 of the capacitance-forming component 30 and the upper electrode 48a of the actuator section 32. If the actuator section 32 can be sufficiently driven when the voltage to be applied to the actuator section 32 is changed from the reference voltage Vb to the first voltage Va1, the driving operation of the actuator section 32 can be controlled by using only the voltage change with respect to the lower electrode 48b.

It is a matter of course that the DC to DC converter according to the present invention is not limited to the embodiments described above, which may be embodied in other various formed without deviating from the gist or essential characteristics of the present invention.

What is claimed is:

1. A DC to DC converter comprising:

a voltage-generating source;

a first element for raising a voltage supplied from said voltage-generating source based on capacitance-varying operation performed by an actuator section; and a second element for retaining a voltage after being raised by said first element in an arbitrary polarity, wherein said first element includes a capacitance-forming component and said actuator section, and said capacitance-forming component includes a first electrode section connected to a current supply line, a second electrode section installed in said actuator section, and a dielectric member arranged between said first and second electrode sections.

2. The DC to DC converter according to claim 1, wherein said actuator section includes an operating section, a vibrating section for supporting said operating section, and a fixed section for vibratingly supporting said vibrating section, and said operating section includes a shape-retaining layer and at least a pair of electrodes to which a driving voltage is applied formed on said shape-retaining layer.

3. The DC to DC converter according to claim 2, wherein said vibrating section and said fixed section are integrally formed from ceramics, and said shape-retaining layer comprises any one of a piezoelectric/electrostrictive and anti-ferroelectric layer.

4. The DC to DC converter according to claim 2, wherein one electrode of said pair of electrodes of said operating section also serves as said second electrode section installed in said actuator section of said capacitance-forming component.

5. The DC to DC converter according to claim 2, wherein an insulating layer intervenes between one electrode of said pair of electrodes of said operating section and said second electrode section installed in said actuator section of said capacitance-forming component.

6. The DC to DC converter according to claim 1, wherein said dielectric member is made of a member having elasticity.

7. The DC to DC converter according to claim 6, wherein said dielectric member contains a ferroelectric filler in said member.

8. The DC to DC converter according to claim 1, wherein a member having a dielectric constant different from a dielectric constant of said dielectric member and having fluidity is arranged at least around said dielectric member.

9. The DC to DC converter according to claim 1, further comprising:

a first switching element for selectively introducing said voltage from said voltage-generating source to said first element based on a first control signal; and a second switching element for selectively introducing said voltage after being raised by said first element to said second element based on a second control signal.

10. The DC to DC converter according to claim 9, further comprising a third switching element for selectively supplying a reference voltage and a first voltage different from said reference voltage to said actuator section based on a third control signal.

11. The DC to DC converter according to claim 10, wherein said first voltage different from said reference voltage is said voltage from said voltage-generating source.

12. The DC to DC converter according to claim 10, wherein said third switching element is in a stopped state when said voltage retained by said second element attains a predetermined voltage, and said DC to DC converter further comprises a fourth switching element for selectively supplying said reference voltage and a second voltage different from said reference voltage to said actuator section based on a fourth control signal.

13. The DC to DC converter according to claim 12, wherein said second voltage different from said reference voltage is said voltage retained by said second element.

14. The DC to DC converter according to claim 12, wherein each of said switching elements comprises a piezoelectric relay having a switching actuator section, and said switching actuator section includes a shape-retaining layer, an operating section having at least a pair of electrodes formed on said shape-retaining layer, a vibrating section for supporting said operating section, and a fixed section for vibratingly supporting said vibrating section.

* * * * *